United States Patent
Huang et al.

(10) Patent No.: US 9,684,369 B2
(45) Date of Patent: Jun. 20, 2017

(54) INTERACTIVE VIRTUAL REALITY SYSTEMS AND METHODS

(71) Applicant: EON REALITY, INC., Irvine, CA (US)

(72) Inventors: Yazhou Huang, Mission Viejo, CA (US); Jan Kjallstrom, Monarch Beach, CA (US); Erbo Li, Lake Forest, CA (US); Mats Johansson, Rancho Santa Margarita, CA (US)

(73) Assignee: EON REALITY, INC., Irvine, CA (US)

( * ) Notice: Subject to any disclaimer, the term of this patent is extended or adjusted under 35 U.S.C. 154(b) by 83 days.

(21) Appl. No.: 14/247,970

(22) Filed: Apr. 8, 2014

(65) Prior Publication Data

US 2015/0286275 A1  Oct. 8, 2015

(51) Int. Cl.
| | |
|---|---|
| *G09G 5/00* | (2006.01) |
| *G06F 3/00* | (2006.01) |
| *G06F 3/01* | (2006.01) |
| *A63F 13/213* | (2014.01) |
| *A63F 13/211* | (2014.01) |
| *A63F 13/843* | (2014.01) |
| *A63F 13/847* | (2014.01) |
| *A63F 13/27* | (2014.01) |

(52) U.S. Cl.
CPC .......... *G06F 3/011* (2013.01); *A63F 13/211* (2014.09); *A63F 13/213* (2014.09); *A63F 13/27* (2014.09); *A63F 13/843* (2014.09); *A63F 13/847* (2014.09)

(58) Field of Classification Search
CPC ................. G06F 3/011; A63F 13/13
USPC ............... 345/156; 434/21; 715/752
See application file for complete search history.

(56) References Cited

U.S. PATENT DOCUMENTS

| | | | |
|---|---|---|---|
| 5,641,288 A | * | 6/1997 | Zaenglein, Jr. ............. 434/21 |
| 5,930,741 A | | 7/1999 | Kramer |
| 6,017,276 A | | 1/2000 | Elson et al. |
| 6,181,343 B1 | | 1/2001 | Lyons |
| 6,324,296 B1 | | 11/2001 | McSheery et al. |
| 6,409,599 B1 | | 6/2002 | Sprout et al. |
| 6,437,820 B1 | | 8/2002 | Josefsson |
| 7,301,648 B2 | | 11/2007 | Foxlin |
| 8,179,366 B2 | | 5/2012 | Richardson et al. |

(Continued)

OTHER PUBLICATIONS

International Search Report & Written Opinion from corresponding International Application No. PCT/US2015/024222 dated Oct. 5, 2015, 19 pages.

(Continued)

*Primary Examiner* — Andrew Sasinowski
*Assistant Examiner* — Kuo Woo
(74) *Attorney, Agent, or Firm* — Innovation Capital Law Group, LLP; Vic Lin

(57) ABSTRACT

An immersive virtual reality system for larger, theater-sized audiences is disclosed. The system enables multiple users to collaborate or work together as a group, or enable groups to compete. Users interact with the virtual reality system through the manipulation of handheld interactive devices. Each device has multiple lights forming a pattern. Tracking sensors monitor the handheld devices, and the system interprets the motions of the users and dynamically changes the virtual reality environment based on the motions of the users. The system may assign unique roles for users within a group.

21 Claims, 18 Drawing Sheets

(56) References Cited

U.S. PATENT DOCUMENTS

| | | |
|---|---|---|
| 8,196,132 B2 | 6/2012 | Ergo et al. |
| 8,411,149 B2 | 4/2013 | Maison et al. |
| 8,615,383 B2 | 12/2013 | Dobbins et al. |
| 2004/0104935 A1 | 6/2004 | Williamson et al. |
| 2006/0017654 A1 | 1/2006 | Romo |
| 2007/0117625 A1 | 5/2007 | Marks et al. |
| 2008/0170750 A1 | 7/2008 | Gordon |
| 2008/0211771 A1 | 9/2008 | Richardson |
| 2009/0315829 A1 | 12/2009 | Maison et al. |
| 2010/0277573 A1 | 11/2010 | Morris |
| 2010/0300006 A1 | 12/2010 | Magpuri |
| 2010/0321382 A1 | 12/2010 | Amaratunga et al. |
| 2011/0207089 A1 | 8/2011 | Lagettie et al. |
| 2011/0246908 A1* | 10/2011 | Akram et al. ............ 715/752 |
| 2012/0054018 A1 | 3/2012 | Pradeep et al. |
| 2012/0086915 A1 | 4/2012 | Rosen et al. |
| 2012/0153838 A1 | 6/2012 | Schenk et al. |
| 2012/0156652 A1 | 6/2012 | Lane et al. |
| 2012/0247030 A1 | 10/2012 | Magpuri |
| 2012/0320042 A1 | 12/2012 | Green et al. |
| 2013/0235034 A1 | 9/2013 | Reitan |
| 2014/0018160 A1 | 1/2014 | Arnone et al. |
| 2015/0258431 A1 | 9/2015 | Stafford et al. |

OTHER PUBLICATIONS

Office Action dated Dec. 16, 2015 from related application No. 14/247,977, 23 pages.
Final Office Action dated Mar. 29, 2016 from related U.S. Appl. No. 14/247,977, 14 pages.

\* cited by examiner

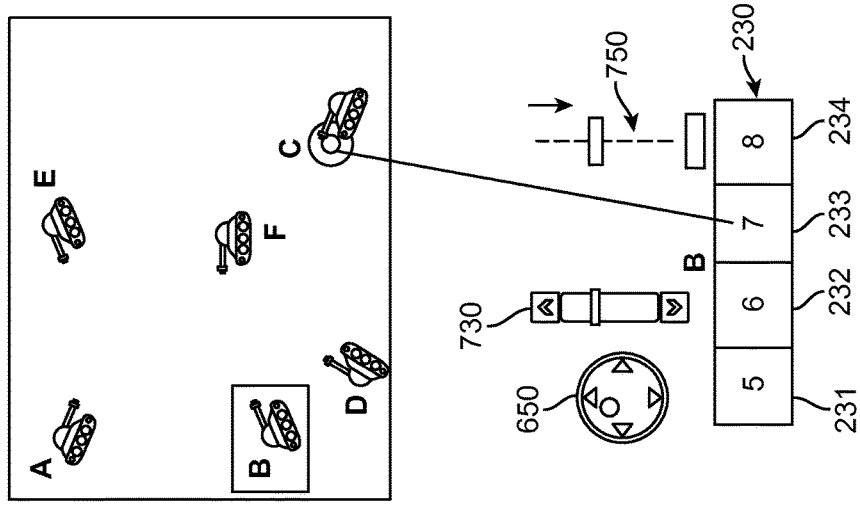
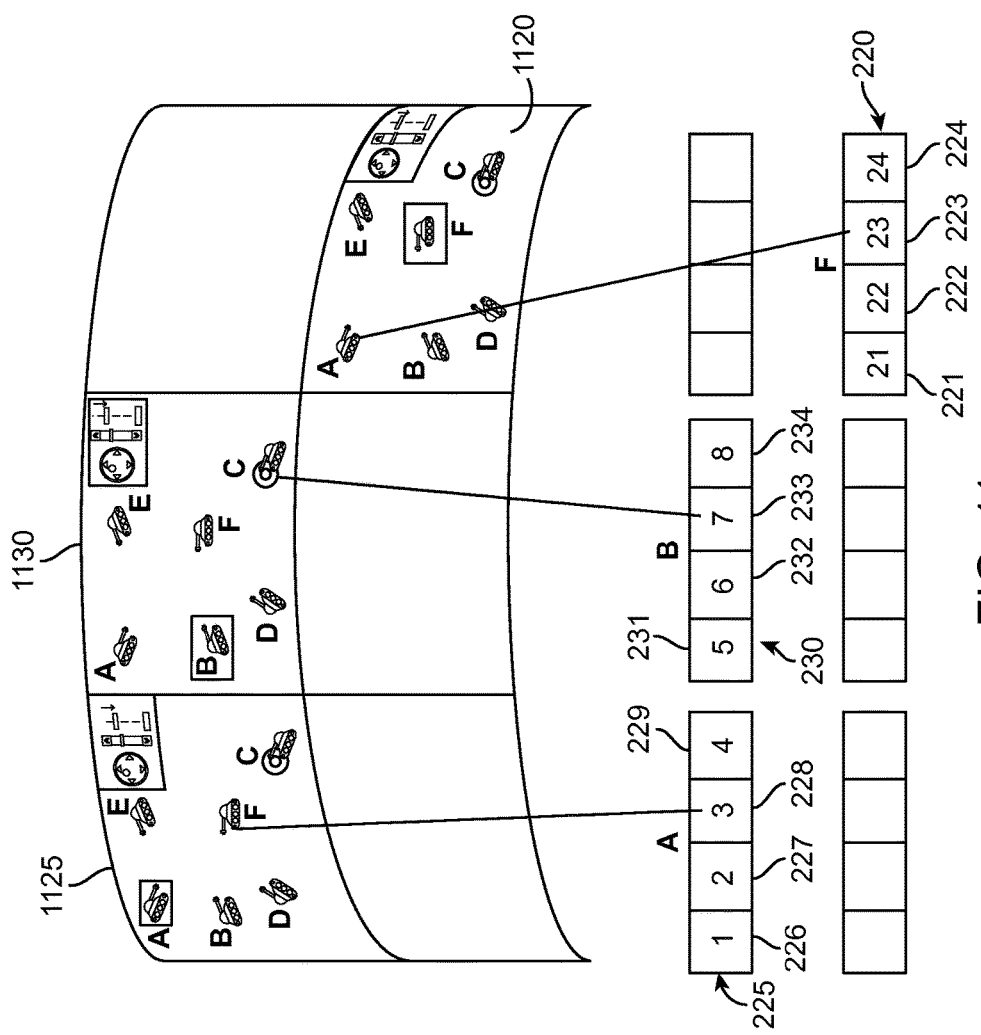
FIG. 12
FIG. 11

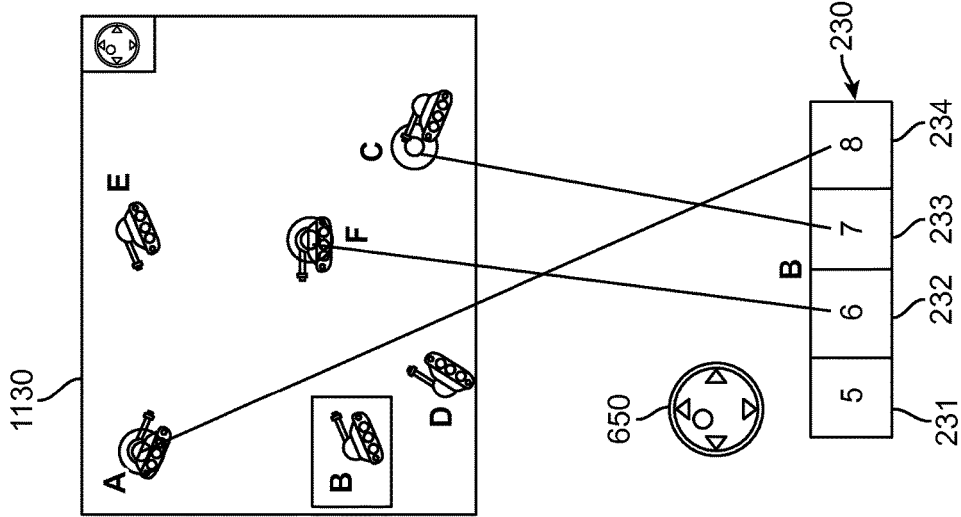
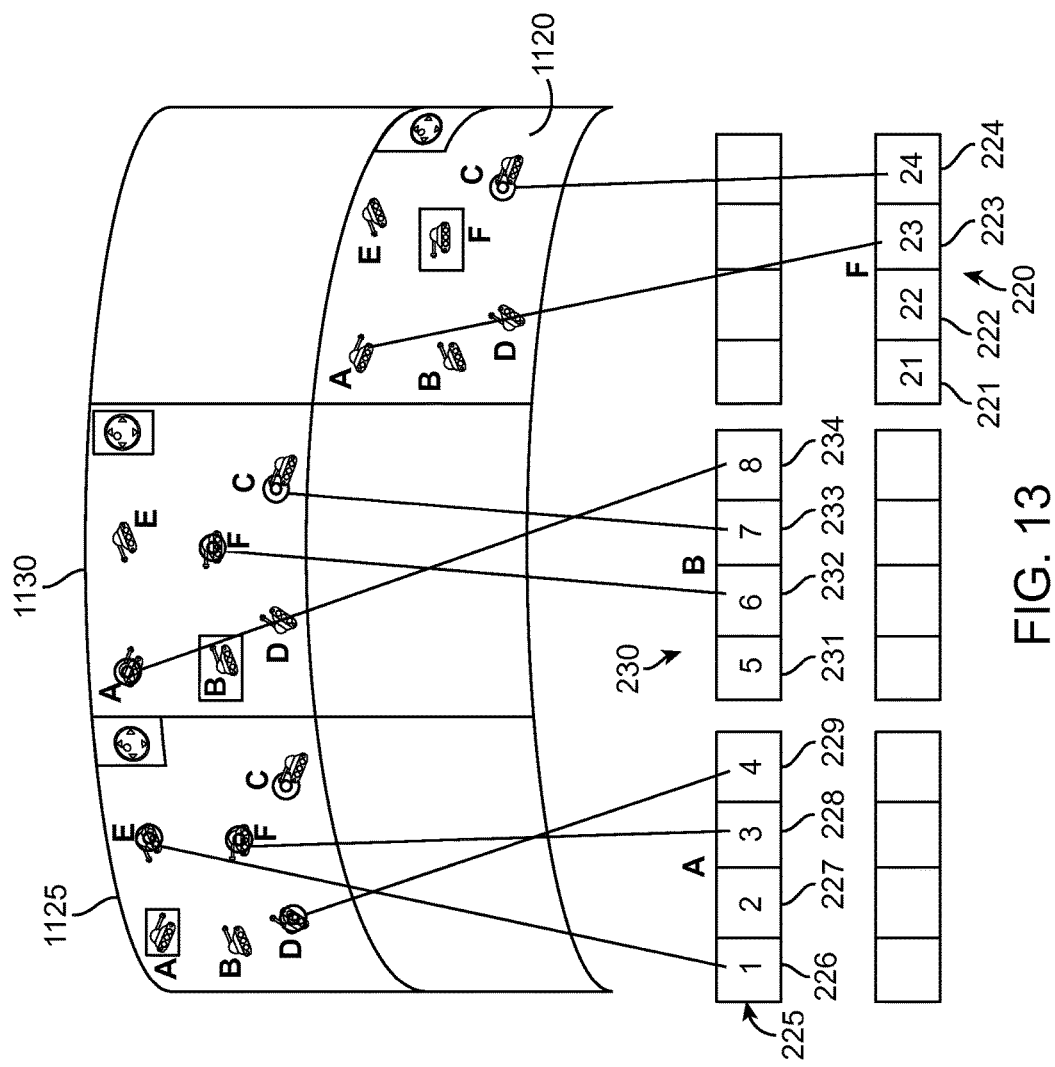

INTERACTIVE VIRTUAL REALITY SYSTEMS AND METHODS

BACKGROUND OF THE INVENTION

1. Field of the Invention

The present invention relates in general to interactive virtual reality systems and methods. More particularly, the invention is directed to interactive virtual reality systems for a large number of users collaborating or competing within a theater or between theaters.

2. Description of the Related Art

Virtual reality environments are becoming increasingly common as they offer a unique form of entertainment and training. However, many typical virtual reality environments are suited for only a small number of users.

Accordingly, a need exists to provide virtual reality environments for larger number of users.

SUMMARY OF THE INVENTION

In the first aspect, a method for providing an immersive virtual reality environment for a plurality of users is disclosed. The method comprises generating a virtual reality environment including a display screen having at least one virtual object and a virtual control console, the virtual control console having a plurality of display icons each representing different functions associated with the virtual object, and providing a handheld interactive device to each of the users, each interactive device having a plurality of lights providing identification and tracking information of said each interactive device, said each interactive device having a trigger mechanism configured for communicating an occurrence of a trigger event. The method further comprises assigning a unique role to said each interactive devices for users forming a single group of users, each role having an associated function for manipulating the virtual object in the virtual reality environment, and tracking said each interactive device to determine a current status of said each interactive device, the current status comprising a position, orientation, motion, existence of a triggering event, and the identification of said each interactive device. The method further comprises interpreting the current status of said each interactive device based on the role assigned to said each interactive device, varying the function associated with the role to manipulate the virtual object based on the interpretation of the current status, and dynamically displaying the manipulated virtual object in the virtual reality environment.

In a first preferred embodiment, assigning a unique role to each of the interactive devices preferably further comprises enabling all interactive devices to have a role of firing virtual projectiles, displaying one or more targets in the virtual reality environment, monitoring the performance of the interactive devices, assigning roles based on the relative performance of the interactive devices. The method preferably further comprises providing feedback to the users. Providing feedback to the users preferably comprises one or more of the following: providing sound effects, enabling motion seats, providing visual effects, or providing visual representation of aiming sights. One of the roles preferably includes a leader role, the leader role having a function of firing a virtual projectile within the virtual reality environment. Interpreting the status of the interactive device having the leader role preferably further comprises detecting the existence of the trigger event from the interactive device having the leader role, determining a trajectory of the virtual projectile based on the position and orientation of the interactive device having the leader role, and determining if the trajectory of the virtual projectile affected one or more virtual objects. The roles preferably include a leader role for firing virtual projectiles, a steering role for maneuvering a virtual object, a speed control role for controlling the speed of the virtual object, and a weapon aiming role for aiming the interactive device to a virtual object.

In a second aspect, a method for providing an immersive virtual reality environment for a plurality of users is disclosed. The method comprises forming a first group of users and a second group of users from a plurality of users, and providing a handheld interactive device to each of the users in the first and second groups, each interactive device having a plurality of lights communicating the identification of said each interactive device, said each interactive device having a trigger mechanism configured for communicating occurrence of a trigger event. The method further comprises generating a virtual reality environment including a display screen having at least one virtual object and a first and second virtual control console for the first and second groups respectively, each virtual control console having a plurality of display icons each representing different functions associated with the virtual object, and assigning a unique role to said each interactive device for users within the first and the second groups of users, each role comprising an associated function for manipulating virtual objects in a virtual environment. The method further comprises tracking said each interactive device to determine a current status of said each interactive device, the current status comprising a position, orientation, motion, existence of a triggering event, and the identification of said each interactive device, and interpreting the current status of said each interactive device based on the role assigned to said each interactive device and the associated group. The method further comprises manipulating the functions associated with the virtual object to provide an altered virtual object, and dynamically displaying the altered virtual object.

In a second preferred embodiment, generating a virtual reality environment further comprises providing a single screen having virtual objects representing the first and second groups. Generating a virtual reality environment preferably further comprises providing a separate screen section for the first and second groups. The method preferably further comprises forming additional groups of users. The method preferably further comprises feedback to the users. Providing feedback to the users preferably further comprises one or more of the following: providing sound effects, enabling motion seats, providing visual effects, or providing visual representation of aiming sights. Assigning a unique role to each of the interactive devices preferably further comprises for the first and second groups, enabling all interactive devices to have a role of firing virtual projectiles, displaying one or more targets in the virtual reality environment, monitoring the performance of the interactive devices, and assigning roles based on the relative performance of the interactive devices.

One of the roles preferably includes a leader role, the leader role having a function of firing a virtual projectile within the virtual reality environment. Interpreting the status of the interactive device having the leader role preferably further comprises detecting the existence of the trigger event from the interactive device having the leader role, determining a trajectory of the virtual projectile based on the position and orientation of the interactive device having the leader role, and determining if the trajectory of the virtual projectile affected one or more virtual objects. The roles preferably include a leader role for firing virtual projectiles, a steering role for maneuvering a virtual object, a speed control role for controlling the speed of the virtual object, and a weapon aiming role for aiming the interactive device to a virtual object.

In a third aspect, a system for providing an immersive virtual reality environment for a plurality of groups of users is disclosed. The system comprises a virtual reality environment including a display screen for groups of users, a plurality of interactive devices, each interactive device comprising a housing having a barrel section and a handle section, and a plurality of lights positioned within the barrel section, the lights spaced apart forming a pattern generally aligned with an expected trajectory of a virtual projectile, a trigger mechanism positioned on the handle section, and a controller coupled to the trigger mechanism and providing electrical current to the lights, the controller communicating trigger events. The system further comprises a plurality of sensors monitoring the interactive devices for light signals and trigger events, the plurality of sensors outputting real-time device current status for each of the interactive devices, and a system controller receiving the real-time current status for each of the devices and updates the virtual reality environment.

In a third preferred embodiment, the virtual reality environment further comprises a spherical or curved screen. The virtual reality environment preferably further comprises a dome. The virtual reality environment preferably further comprises a spherical screen for displaying three dimensional images, multiple motion seats for a plurality of users, and a surround sound system for providing sound effects to the users.

In a fourth aspect, a handheld interactive device is disclosed. The interactive device comprises a housing having a barrel section and a handle section, a plurality of lights positioned within the barrel section, the lights spaced apart forming a pattern generally aligned with an expected trajectory of a virtual projectile, a translucent cover essentially surrounding the lights and allowing light to radiate in a nearly 360 degree far field emission pattern, a trigger mechanism positioned on the handle section, and a controller coupled to the trigger mechanism and providing electrical current to the lights, the controller communicating trigger events.

In a fourth preferred embodiment, the plurality of lights are a first and a second light positioned collinearly and parallel with the expected trajectory of the virtual projectile. The plurality of lights are preferably a first, a second, and a third light positioned collinearly and parallel with the expected trajectory of a virtual projectile. The plurality of lights are preferably a first and a second light positioned collinearly and parallel with an expected trajectory of the virtual projectile, and a third light positioned offset from expected trajectory of the virtual projectile. The plurality of lights are preferably a first and a second light positioned collinearly and parallel with an expected trajectory of a virtual projectile, and a third and a fourth light positioned offset from expected trajectory of the virtual projectile. Providing electrical current to the lights preferably further comprises providing a pulsed signal representing a unique identification for the interactive handheld device.

In a fifth aspect, a system for tracking a plurality of handheld interactive devices is disclosed. The system comprises a virtual reality environment for a plurality of users, and a plurality of interactive devices. Each interactive device comprises a housing having a barrel section and a handle section, a plurality of lights positioned within the barrel section, the lights spaced apart forming a pattern generally aligned with an expected trajectory of a virtual projectile, a translucent cover essentially surrounding the lights and allowing light to radiate in nearly 360 degree far field emission pattern, a trigger mechanism positioned on the handle section, and a controller coupled to the trigger mechanism and providing electrical current to the lights, the controller communicating trigger events. The system further comprises a plurality of sensors monitoring the interactive devices for light signals and triggers events, the plurality of sensors outputting real-time device current status for each of the interactive devices, and a system controller receiving the real-time current status for each of the devices and updates the virtual reality environment.

In a fifth preferred embodiment, the plurality of lights for said each interactive device comprises a first and a second light positioned collinearly and parallel with the expected trajectory of the virtual projectile. The plurality of lights for said each interactive device preferably comprises a first, a second, and a third light positioned collinearly and parallel with the expected trajectory of a virtual projectile. The plurality of lights for said each interactive device preferably comprises a first and a second light positioned collinearly and parallel with an expected trajectory of the virtual projectile, and a third light positioned offset from expected trajectory of the virtual projectile. The plurality of lights for said each interactive device preferably comprises a first and a second light positioned collinearly and parallel with an expected trajectory of a virtual projectile, and a third and a fourth light positioned offset from expected trajectory of the virtual projectile.

The controller for said each interactive device providing electrical current to the lights preferably further comprises providing a pulsed signal representing a unique identification for the interactive handheld device. The plurality of sensors monitoring the interactive devices for light signals and trigger events preferably comprises monitoring the light signals asynchronously from the monitoring of the trigger events. The system controller is preferably further configured for disabling a specific interactive device. The system controller is preferably further configured for permanently enabling a specific interactive device. Updating the virtual reality environment preferably comprises altering a virtual object in the virtual reality environment.

In a sixth aspect, a method for providing tracking information of an interactive device is disclosed. The method comprises providing interactive devices having a plurality of marker lights to a plurality of users, generating pulsed light signals from the marker lights for each interactive device, the pulsed light signal representing a unique identification for said each interactive device, tracking the emitted light from the interactive devices, determining the lights associated with a particular interactive device based on the pulsed light signal, determining if one or more lights have been occluded, and calculating the position and orientation based on the lights for as device which are not occluded.

In a sixth preferred embodiment, the plurality of marker lights are lights spaced apart forming a pattern generally aligned with an expected trajectory of a virtual projectile. The plurality of lights for said each interactive device preferably comprises a first, a second, and a third light positioned collinearly and parallel with the expected trajectory of a virtual projectile. The plurality of lights for said each interactive device preferably comprises a first and a second light positioned collinearly and parallel with an expected trajectory of a virtual projectile, and a third and a fourth light positioned offset from expected trajectory of the virtual projectile.

These and other features and advantages of the invention will become more apparent with a description of preferred embodiments in reference to the associated drawings.

DESCRIPTION OF THE DRAWINGS

FIG. 11 illustrates exemplary multiple groups interacting in a virtual reality environment having multiple battle scenes on a screen split into screen sections.

FIG. 12 illustrates details of a single group for the environment shown in FIG. 11.

FIG. 13 illustrates exemplary multiple groups interacting in a virtual reality environment having multiple battle scenes on a screen split into screen sections in one or more embodiments.

FIG. 14 illustrates details of a single group for the environment shown in FIG. 13.

DETAILED DESCRIPTION OF THE PREFERRED EMBODIMENTS

The following preferred embodiments are directed to immersive, virtual reality environments for multiple users. Typical virtual reality environments may accommodate a limited number of concurrent users in a shared environment. Cameras monitor the actions of the users, typically using a "marker" that is placed on the user or placed on handheld devices. A marker may either be a small reflective surface or a small light. By using multiple cameras, the position and orientation of a set of markers may be calculated using triangulation methods. When several users share a virtual reality environment, the markers may not be always visible to the camera as users move and block markers for themselves and for others in the area. Hence, providing virtual reality environments for multiple users may be preferred in many applications.

One or more embodiments are directed to an immersed virtual reality system for larger, theater-sized audiences. The system enables multiple users to collaborate or work together as a group, or enable groups to compete. Users interact with the virtual reality system through the manipulation of handheld interactive devices. Each device has multiple lights forming a pattern. Tracking sensors monitor the handheld devices, and the system interprets the motions of the users and dynamically changes the virtual reality environment based on the motions of the users. In an embodiment, the system assigns unique roles for users within a group.

One or more of the embodiments described herein are directed to games in virtual reality environments. These embodiments are provided to illustrate general concepts, and should not be taken as being limiting in nature. Systems and methods for providing training, education, or entertainment are contemplated in one or more embodiments. As used herein and as is commonly used in the art, an object may be characterized by six degrees of freedom. The components of the six degrees of freedom include position of the object; that is, the x, y, and z coordinates of the object relative to a known fixed point. The six degrees of freedom also include the orientation of the object including the pitch, yaw (or heading), and roll. As used herein, and as is commonly known in the art, the word "collinear" generally refers to points on the same line. Hence, two points would be considered as being collinear.

Figure 1:
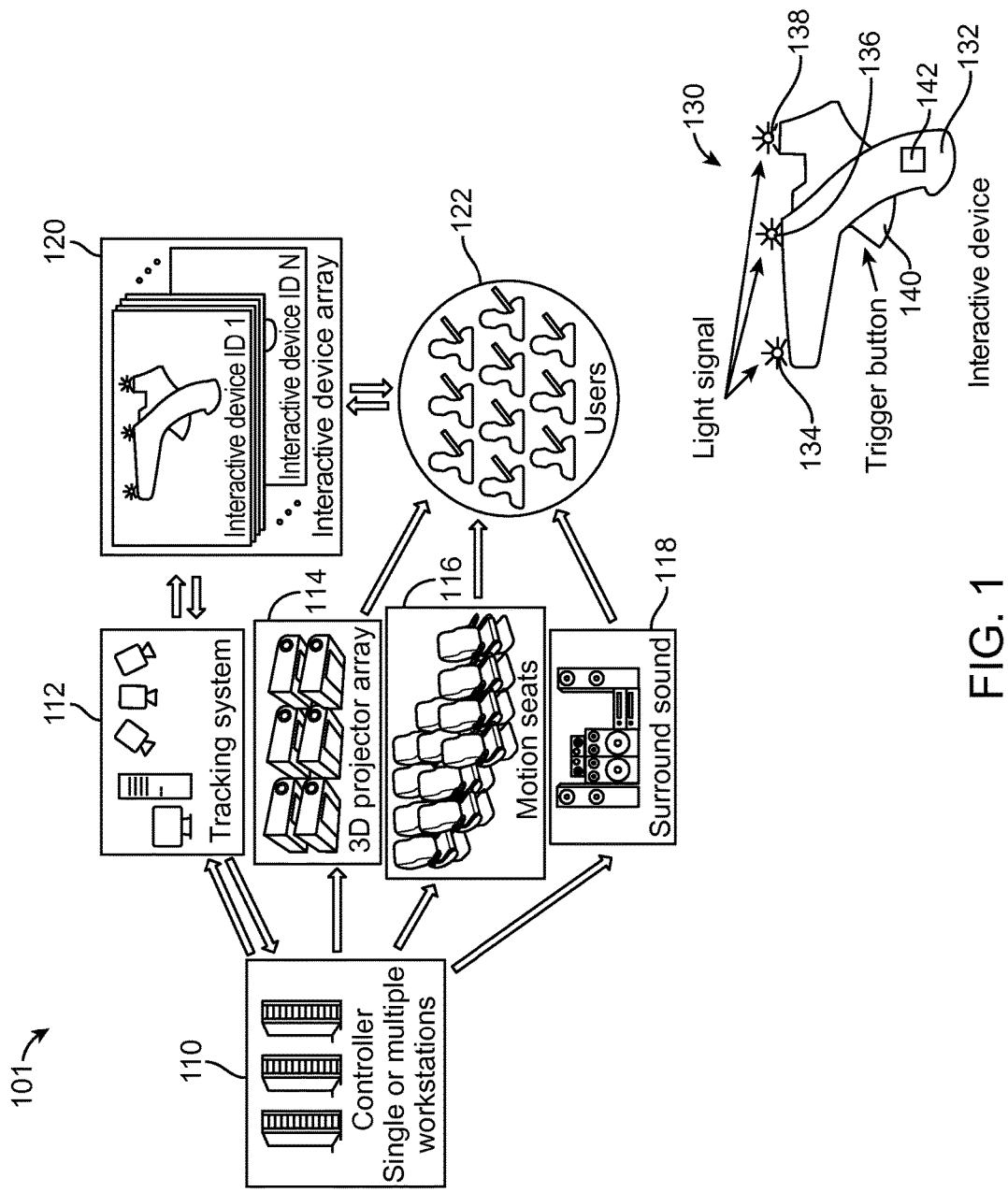
FIG. 1 is a schematic, block diagram of multiple users interacting in a theater-type setting using interactive devices.

FIG. 1 is a schematic, block diagram of virtual reality system 101 having multiple users interacting in a shared, theater-type setting using interactive devices. The system 101 comprises one or more controllers 110, a tracking system 112, a 3D projector array 114, motion seats 116, a surround sound system 118, and handheld interactive devices 120. In an embodiment, the users 122 are seated in motion seats 116. Each user 122 holds an identifiable interactive device 130. The interactive device 130 has a controller 142 and a housing 132 shaped similar to that of a gun in an embodiment with a trigger button 140. In one or more embodiments, multiple trigger buttons or one or more other inputs may be employed. Lights 134, 136, and 138 are positioned on the top of the housing 132. The tracking system 112 monitors the lights 134, 136, and 138 of the interactive devices 130 and captures 5 degrees of freedom ("DOF") or perhaps 6 DOF movement of each interactive device. Additional trigger buttons may be contemplated in one or more embodiments.

Hence, the system 101 knows the identification of the user ID, existence and timing of triggering events, and the tracking information including position and orientation of each device at all times. This may be in contrast to conventional systems which may only determine the position and orientation of devices during a triggering event, or during a short period of time following a triggering event. Embodiments provide for two-way communication between the users 122 and the interactive system 101. As discussed below, the users 122 may collaborate with each other through the interactive devices 130. The system 101 is capable of providing feedback to the users, including, for example, providing sound effects, enabling motion seats, providing visual effects, or providing visual representations of aiming sights and/or the virtual projectiles.

Figure 2:
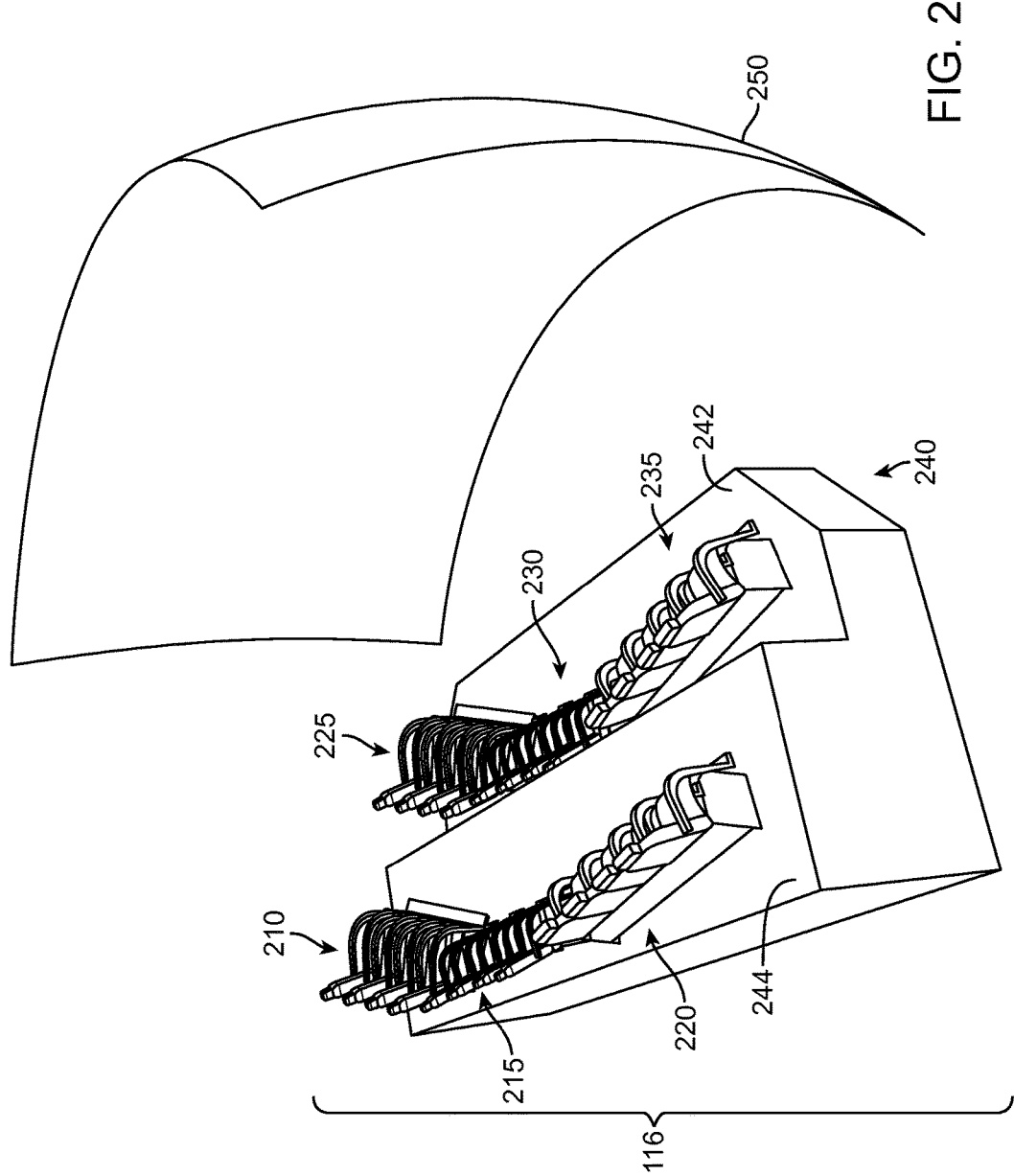
FIG. 2 is an exemplary theater for multiple users that provide an interactive virtual reality environment.

FIG. 2 is an exemplary virtual reality theater in an embodiment that provides a true immersive and real-time interactive system. In an embodiment, three benches 225, 230, and 235 are located on a lower platform 242, and three benches 210, 215, and 220 are located on an upper platform 244. Each bench comprises four motion seats. The system 240 tracks twenty-four users in an embodiment.

The system 240 also comprises a curved screen 250 in one or more embodiments. However, spherical screens or domes are contemplated in one or more embodiments. The system 240 delivers 3D stereoscopic contents on a spherical or curved screen 250. Users 122 wear stereoscopic glasses to watch the 3D content. The curved screen 250 provides greater field-of-view ("FOV") than that of a flat screen and delivers a true immersive experience for the users 122.

The system 240 provides two-way interactions for a large group of users. Users 122 interact with the content using the handheld interactive devices 130. Users 122 receive instant feedback through visual or audio effects from the content displayed on the curved screen 250, and also through physical motion from the motion seats 116 including through vibration, water spray, scent, or touch.

The motion seats 116 may employ several effects for simulating the physical changes in a virtual environment. Motion seats 116 may employ actuators which may cause the motion seat 116 to experience changes in pitch, roll, heading and height. The motion seats 116 may provide other effects such as through vibration under the seat, pokers under the seat, pokers on the back, face air spray, neck air spray, face water spray, leg ticklers, and delivery of scents. Seat motions and effects may be generated as real-time responses towards all users 122. For example, on a roller coaster ride, all seats move along a track. Seat motions and effects may be generated as real-time responses towards each group of users who share one bench of motion seats. For example, consider a group driving a racing car on a track. If a car hits a road block, the seats of the group may vibrate violently to signal the collision to the members of the group, and to the members of this group only. In one or more embodiments, each group may experience a unique experience with the motion seats, or the entire audience or a sub-set of the audience may experience the same experience The systems presented in FIGS. 1 and 2 may provide differing experiences to the users 122. For example, each user 122 may interact with the content on the screen 250 individually. In another embodiment, each user 122 may compete with other users by shooting at a shared mutual target to gain points. Alternatively, all users 122 may shoot at the same target and win the game. In another example, all users 122 may participate in a training application, or may vote for desired options, such as, for example, choosing desired scenarios based on how the story line develops, or choosing desired scenarios which affect how the story line develops.

Collaboration among users 122 is contemplated in one or more embodiments. The users 122 may interact with the content as a small group, compete with other users within the same group, collaborate with other users within the same group, or may compete as a group against other groups. In one or more embodiments, a group leader may be assigned based on his performance in an initial round of a game. In an embodiment, the leader is given more control over the game. In an embodiment, the leader role has a function of firing virtual projectiles within the virtual reality environment. The system scores the accuracy of the leader by detecting the existence of the trigger event from the interactive device having the leader role, determining a trajectory of the virtual projectile based on the position and orientation of the interactive device having the leader role, and determining if the trajectory of the virtual projectile affected one or more virtual objects. The users 122 sharing a bench of multiple motion seats may form a group in one or more embodiments.

Figure 3:
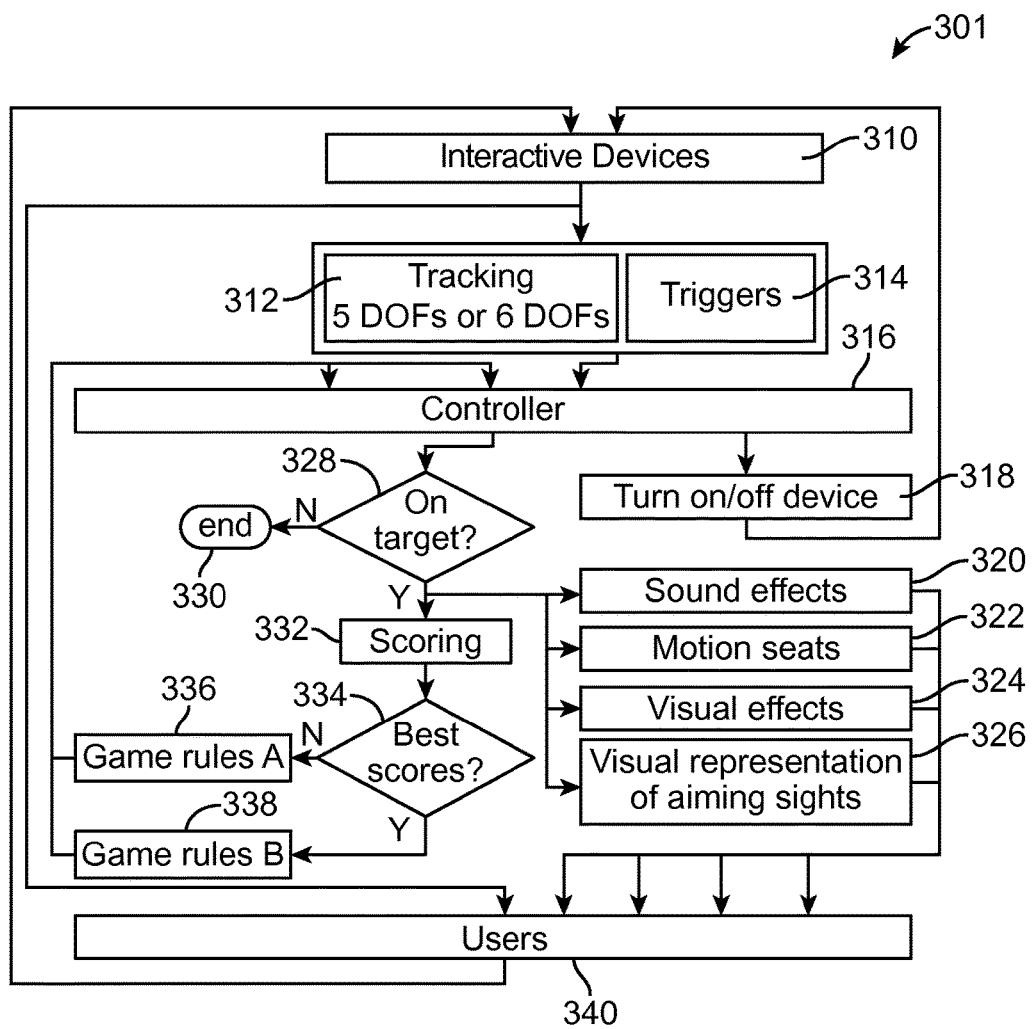
FIG. 3 depicts an exemplary process for providing two-way interactive experiences for multiple users in an embodiment.

FIG. 3 depicts an exemplary process 301 for providing a two-way interactive experience for multiple users in an embodiment. The tracking system 112 monitors the interactive devices 130 (step 310). The position, orientation, and motion of the interactive devices are determined (step 312) as well as the existence and timing of a trigger event (step 314). The current status of the devices (i.e., position, orientation, motion, and triggering event information) is processed by the controller (step 316). Based on the current status of the interactive device 130, the controller will calculate the trajectory of a virtual projectile when a triggering event is detected (step 328). If the virtual projectile misses the target, no action is taken (step 330). If the virtual projectile hits the target, two pathways of events will occur. First, appropriate feedback is generated such as through sound effects (step 320), activation of the motion seats (step 322), display of visual effects (step 324), or display of visual representations of aiming sights and projectile (step 326) and is provided to the users (step 340). Second, the scoring of the performance of the shootings is determined (step 332) and the best scores are determined (step 334). If a particular user has the best scores, "Game rules A" are applied to that user (step 336) which is sent back to the controller. If the user does not have the best scores, "Game rules B" are applied to the user (step 338) which is sent back to the controller. Hence, the system 101 may treat users differently based on the shooting performance of the users 122. The controller may also turn off or turn on the entire interactive devices 130 for a particular user (step 318). The controller may also turn off interactive devices partially to disable tracking 312, and keep monitor only the triggering events 314 for a particular user (step 318).

Hence, the system 101 is capable of providing two-way interaction and may treat users in the same game differently. The system 101 judges user performance, rewards the users having the best performance, and may temporarily disable or partially disable the interactive devices 130 of users exhibiting bad performance. The aiming sight on the screen could change to permanent for best users in an embodiment. The users receive visual and audio feedback through the real-time content (instead of fixed pre-rendered content, or switching among a limited pool of pre-rendered endings, commonly seen on theme park rides). The selected users receive additional visual feedback from a true 3D pointer (i.e., aiming sights, scene manipulators) represented in any form allowing full 5-DOF or 6-DOF interaction.

In scenarios involving multiple participants, each participant holds an interactive device 130 with a unique identification. The participants are divided into groups. Depending on the scenario, the system may assign one group to take the lead in controlling of the virtual reality environment, by turning off or partially turning off the interactive devices 130 for other groups. The light signals on the inactive interactive devices 130 would remain off as a visual clue for the users.

In an embodiment, the sampling rates for the tracking and for the trigger actions are independent of each other. The tracking and trigger actions are sampled from the interactive device 130 asynchronously, as fast as the system allows as compared to systems using Kalman filters or trigger queues. In one or more embodiments, a plurality of sensors monitor the interactive devices for both the light signals and trigger events, where the sensors monitor the light signals asynchronously from the monitoring of the trigger events. In an embodiment, the system does not introduce additional time delays.

Embodiments provide for two-way interaction having "2-way A" from user to system, and "2-way B" from system to user. Each user holds an interactive device 130 with a unique identification. The interactive device 130 is tracked for its position, orientation (i.e., 5 DOF or 6 DOF tracking) and trigger button status. Events are fed into a controller in the form of "User ID, timing, device position and orientation, trigger status" for interaction "2-way A" (steps 312 and 314). The controller validates each event based on interactive objects (e.g. targets) in the scene, and reacts accordingly (step 316). A multi-player game scenario is used as an example to illustrate this process.

In an embodiment, if a user shoots and hits an object, the event goes through the scoring rules (step 332). Meanwhile multi-sensory effects are triggered ("2-way B"), including sound effects (e.g. sounds of explosions), motion seats movements (e.g. vibration of the motion seats), visual effects (e.g. displaying flames on screen) and other visual information, including changing the representations of aiming sights (e.g. show the laser, change color or size of an object on the screen, show the projectiles) in steps 320-326. If the user misses the target, the event is discarded (step 330). Scoring rules calculate the scores and ranking (step 332), and the result goes back into the controller for displaying the results on the screen to provide interaction "2-way B."

Based on the scoring rules, the system may also decide to temporarily turn off the light signals (for tracking) on certain interactive devices as a means to disable interactive devices 130 for users not meeting set performance levels who are providing interaction "2-way B." Users receive all of the above described multi-sensory feedback during the game (interaction "2-way A").

Embodiments involving games described herein are employed only as examples. The two-way interaction mechanism may also be used in an industrial or training environment. For example, designers can visualize a prototype product, architects can visualize a building design, and trainees may participate in a virtual training experience.

Figure 4:
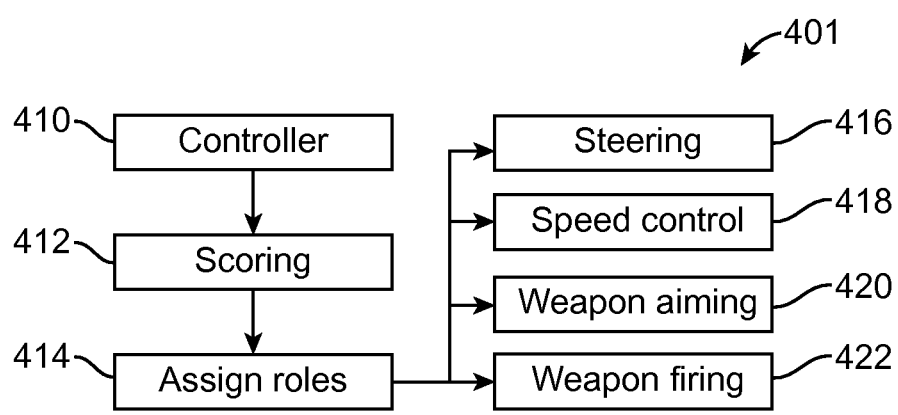
FIG. 4 depicts an exemplary process for assigning roles to users within a group based on scoring in an embodiment.

FIG. 4 depicts an exemplary process 401 for assigning roles to users within a group based on scoring in an embodiment. A system such as system 101 may assign a unique role to each of the interactive devices by enabling all interactive devices to have a role of firing virtual projectiles, displaying one or more targets in the virtual reality environment, monitoring the performance of the interactive devices, and assigning roles based on the relative performance of the interactive devices.

Specifically, the controller determines whether users have successfully hit the target with a virtual projectile (step 410). Scoring of the users 122 is determined (step 412). Based on the scoring, roles are assigned to the users (step 414). In one or more embodiments, a group is comprised of four users 122. One user may be assigned the role for steering a virtual vehicle (step 416), a second user may be assigned to speed control (step 418), a third user may be assigned to weapon aiming (step 420), and the fourth user may be assigned to weapon firing (step 422). In one or more embodiments, one of the users may be considered to be a leader and have additional authorizations and responsibilities. In one or more embodiments, roles may be assigned based on other factors, such as, but not limited to, based on the preferences of the users, based on the age or status of users, or based on the results in previous sessions.

Figure 5:
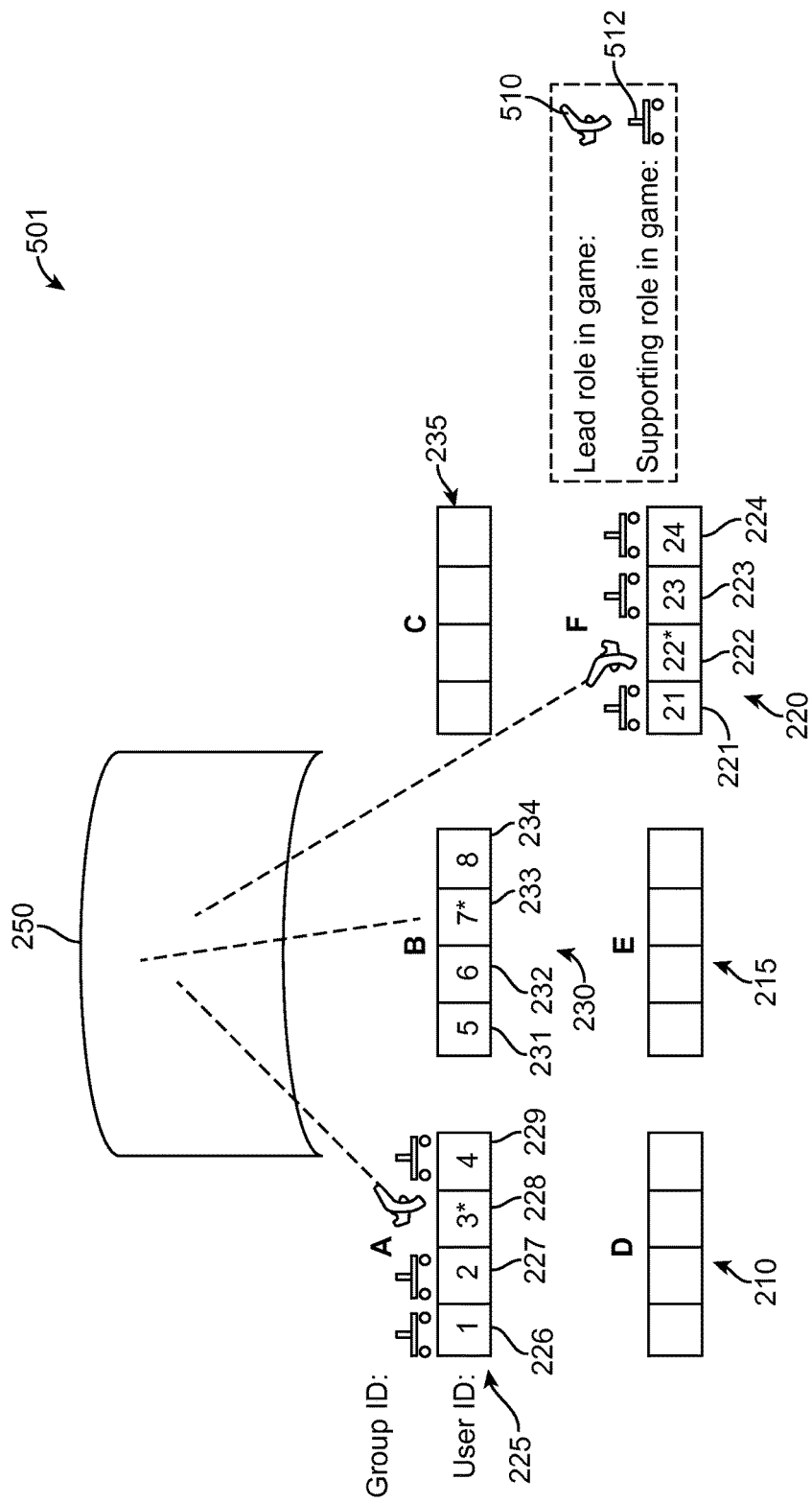
FIG. 5 illustrates groups of users interacting with other groups in a virtual reality environment.

FIG. 5 illustrates groups of users interacting with other groups in a virtual reality environment 501. The system 501 accommodates 6 groups of 4 users and has six benches including bench 225 labeled as "A," bench 230 labeled as "B," bench 235 labeled as "C," bench 210 labeled as "D," bench 215 labeled as "E," and bench 220 labeled as "F." Each of the benches has four motion seats. For example, bench 225 has motion seats 226-229 labeled as 1-4, bench 230 has motion seats 231-234 labeled as 5-8, and bench 220 has motion seats 221-224 labeled as 21-24. Each bench is considered a group in an embodiment, although groups may comprise other sets of users unrelated to the seating on the benches in one or more embodiments.

Within each group, one of the users is considered as having a lead role, and the other three users in the group are considered as having a supporting role in an embodiment. For example, users in motion seats 228, 233, and 222 have lead roles and have an interactive device 510. The other users 226, 227, 229, 231, 232, 234, 221, 223, and 224 have supporting roles and have a device 512 as indicated. In one or more embodiments, the device 510 may physically differ from device 512. In other embodiments, the device 510 is identical to device 512 but has been instructed by the controller to have differing capabilities and functions.

Hence, this mechanism of having differing roles is introduced to avoid chaos by having too many users. For example, in a multi-player game scenario, instead of showing aiming sights for all users 122, the system 501 assigns leader roles within each user group, and only displays aiming sights for the leaders. Other members in the group play supportive roles, without any visual representation for their interactive device on screen in an embodiment. All members of a group collaborate and work together to achieve goals.

For each group, the leader aims and shoots the main target, and rest of the supporting group members only use the trigger button on the interactive device, by pressing the trigger at the correct moment, to dodge incoming obstacles, or steer away from road blocks in an embodiment. The number of aiming sights is limited, and the interactions can be categorized as having explicit controls (for users with aiming sights) and implicit controls (for users without aiming sights).

One or more embodiments illustrate a novel way for multi-user interaction with the scene on a shared screen. The key is to involve everyone in the interaction as much as possible by dividing the users into groups, and create an efficient way to involve all users in the interaction without cluttering the screen with too much information. The overall goal is teamwork among all users. In one or more embodiments, the lead role may rotate among the group members.

Figure 6:
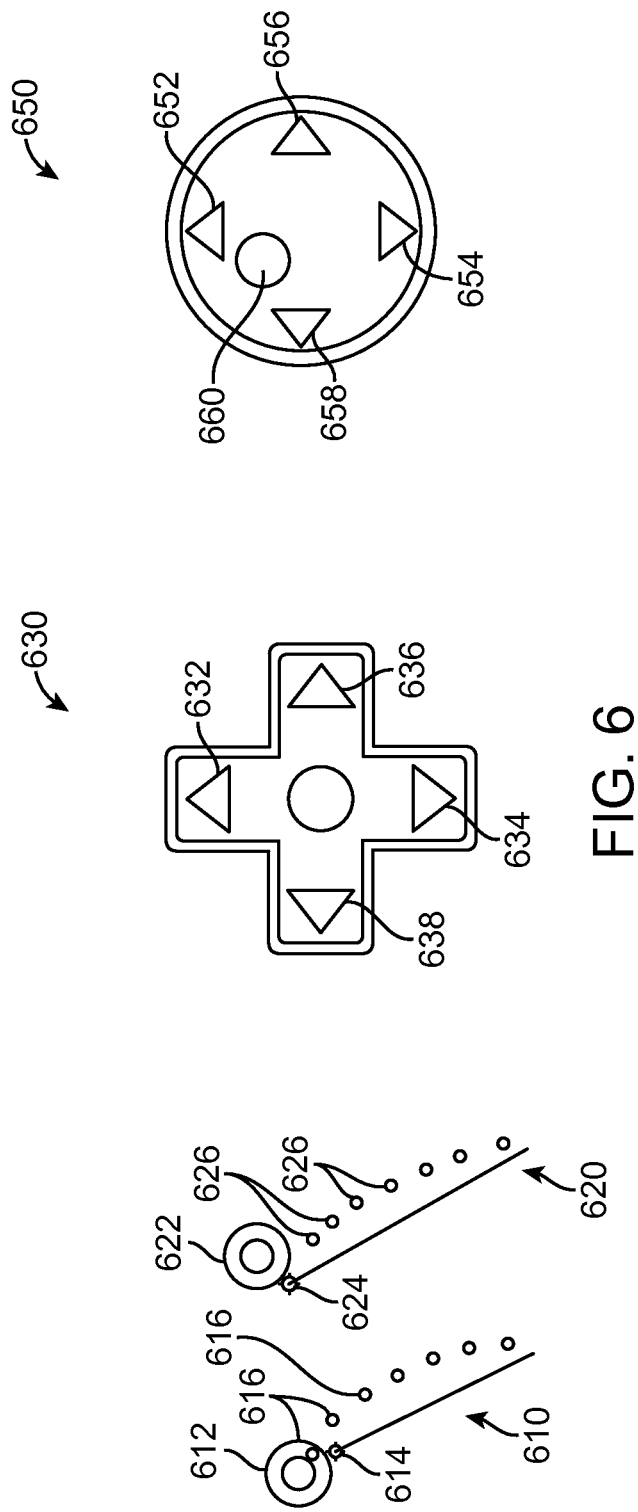
FIG. 6 depicts exemplary display icons in one or more embodiments.

FIG. 6 depicts exemplary virtual representations in one or more embodiments. Virtual representations 610 and 620 present exemplary representations of shooting trajectories displayed for the users in the lead role. Only the group leaders have explicit controls using the 5 DOF or 6 DOF interactive device 510. The targets 612 and 622, aiming sights 614 and 624, bullets and shooting trajectories 616 and 626 from each leader are shown on the screen. These visual representations may change according to the outcome of the game. Representation 610 shows a projectile 616 hitting the target 612, and representation 620 shows a projectile 626 missing the target 622.

Supporting users having implicit controls may see display icons such as display icons 630 and 650. These heads-up displays ("HUDs") are shown for each supporting member on the screen. HUDs are small enough not to interfere with the scene. For example, the heading and pitch information from the device 512 may be used to control either steering or speed (i.e., 4-directional), or only the steering control (i.e., 2-directional), or only the timing control where users press trigger buttons exactly at the desired timing.

Display icon 630 is a virtual representation of a directional pad ("D-pad") often found on gaming control consoles that provide for thumb operated four-way directional control. The display icon 630 has an up button 632, a down button 634, and left button 638, and a right button 636. In an embodiment, a supporting user may select the up button 632 by waving the interactive device 512 in an upward motion; select the down button 634 by waving the interactive device 512 downward, the left button 638 by waving the interactive device 512 to the left, and the right button 636 by waving the interactive device to the right. In one or more embodiments, a trigger button may be pressed during the motion to indicate to the tracking system that the motion has significance.

Display icon 650 is a virtual representation of a joystick. The display indicator 650 has an up indicator 652, a down indicator 654, a left indicator 658, a right indicator 656 as well as a positional indicator 660 showing the relative two-dimensional placement associated with the functionality of the display icon 650. For directional steering and speed control, heading or pitch information from the device may be used. The dot positional indicator 660 shows the current measurement from the tracking information.

Figure 7:
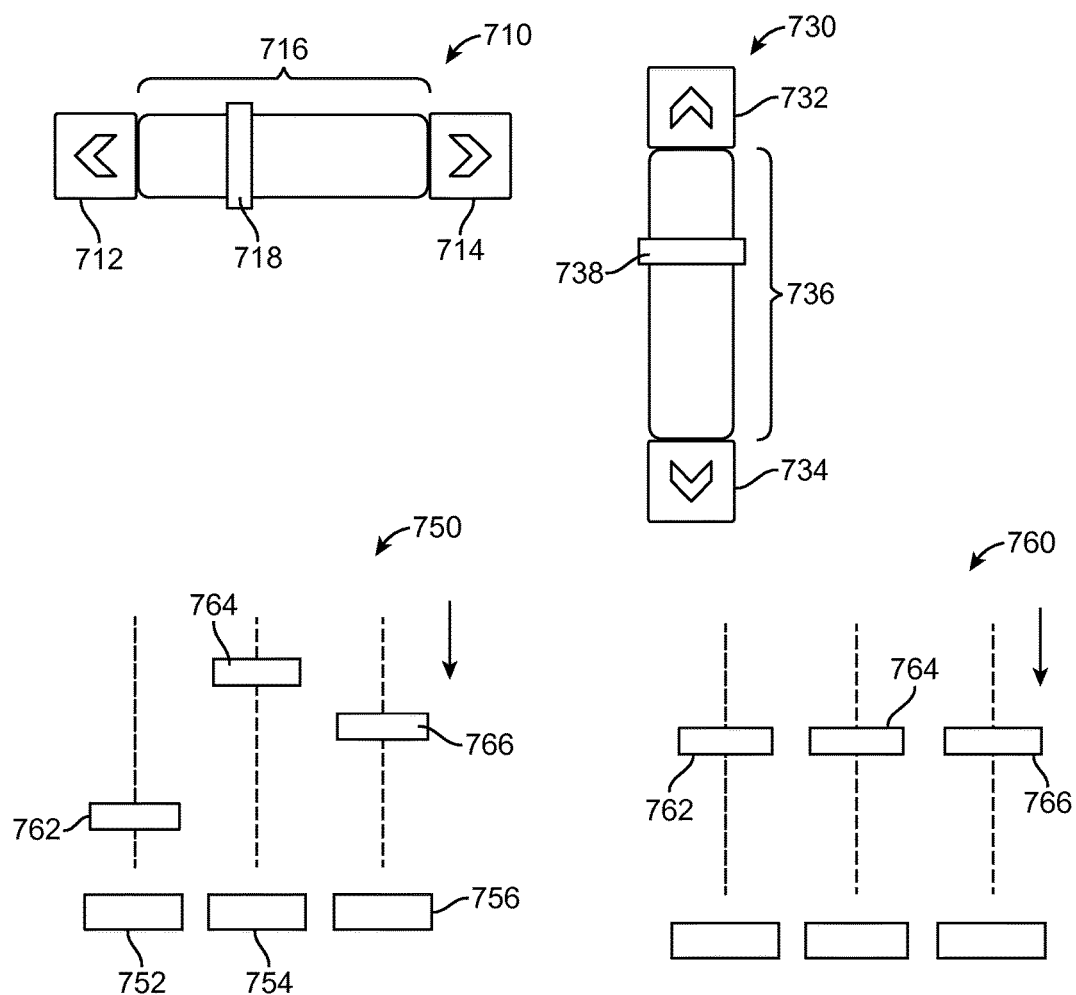
FIG. 7 depicts additional exemplary display icons in one or more embodiments.

FIG. 7 depicts additional exemplary display icons in one or more embodiments. Display icon 710 is a virtual representation of a horizontal sliding switch. Icon 710 has left arrow indicator 712, a right arrow indicator 714, an intermediate area 716, and a slide 718 showing the current relative value of a function or one-dimensional parameter. Display icon 730 is a virtual representation of a vertical sliding switch. Icon 730 has an up arrow indicator 732, a down arrow indicator 734, an intermediate area 736, and a slide 738 showing the current relative value of a function or one-dimensional parameter. In an embodiment, the slides 718 and 738 may show the relative heading and pitch of a virtual object. User may engage with these display icons by waving the interactive device 512 up and down for icon 710, and left and right for icon 730.

Display icon 750 depicts a virtual representation of three vertical sliding switches. The relative baselines 752, 754, and 756 represent the minimum value of the associated function or parameter, and slides 762, 764, and 766 show the current value of a function or parameter such as the current pitch, heading or timing information.

Display icon 760 depicts a similar virtual representation of three vertical slides. In an embodiment, team members may try to coordinate timing control to indicate good teamwork. When all users simultaneously press the trigger exactly at the desired time, extra points or relative strength credits may be awarded in an embodiment.

Figure 8:
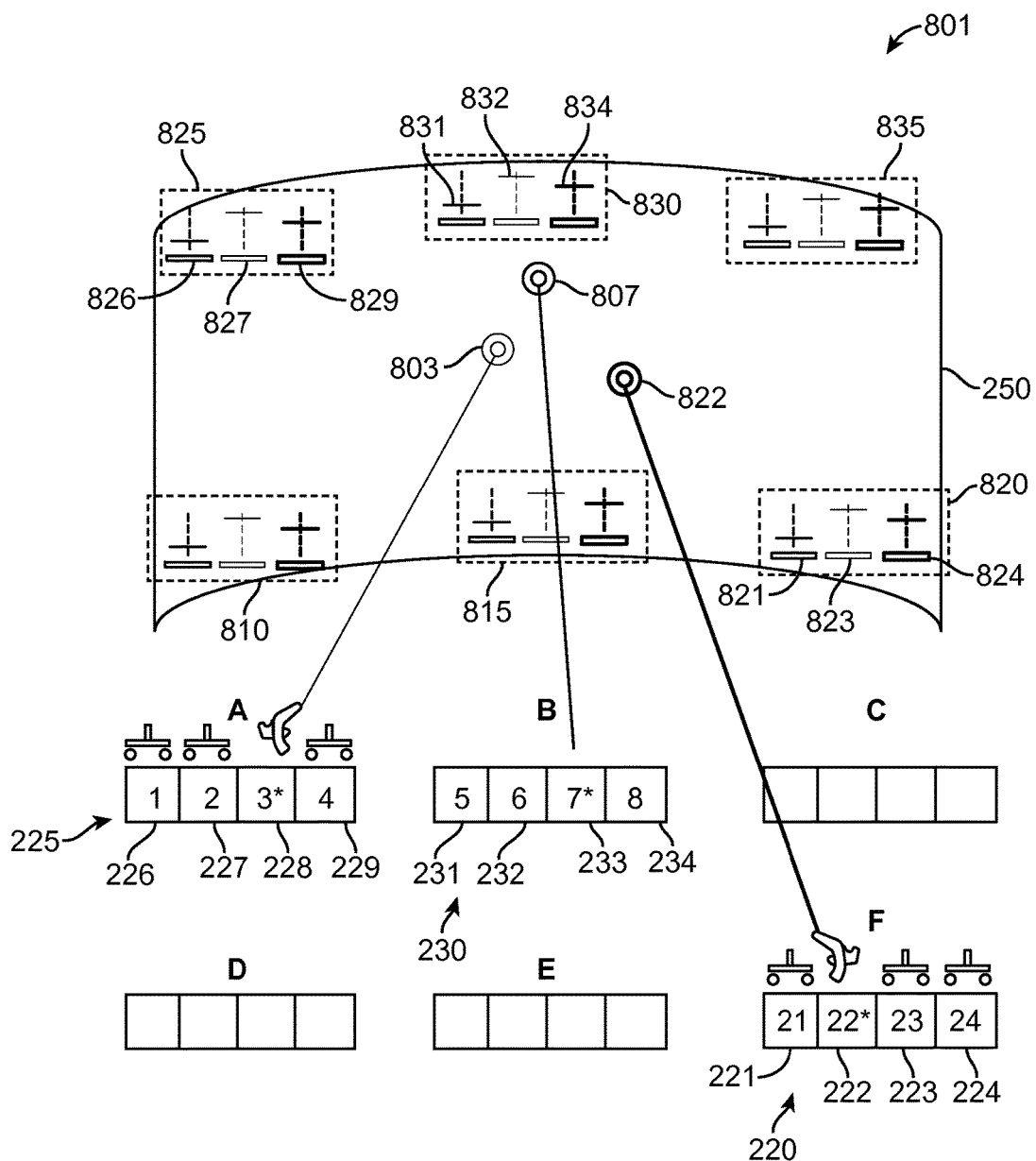
FIG. 8 illustrates exemplary multiple groups interacting in a virtual reality environment having virtual control consoles on a common single screen.

FIG. 8 illustrates multiple groups interacting in a virtual reality environment 801 having virtual control consoles on a common single screen. The configuration of the groups and users are similar to that discussed above with respect to FIG. 5. The screen 250 displays targets 803, 807, and 822 which the leaders in motion seats 228, 233, and 222 are attempting to hit. The display also shows virtual control consoles 825, 830, 835, 810, 815, and 820 which are associated with the groups in benches 225, 230, 235, 210, 215, and 220 respectively. The dashed line indicating the virtual control console is for illustration purposes and may not be visible or of the correct scale in one or more embodiments.

Virtual reality environment 801 generates a virtual reality environment having virtual objects such as the targets 803, 807, and 822 displayed on screen 250. The screen also displays virtual control consoles 810, 815, 820, 825, 830, and 835 which may have a plurality of display icons such display icons 826, 827, and 829 each representing different functions or parameters associated with a virtual object. For example, display icon 826 may represent the speed of a vehicle, display icon 827 may indicate an angle of orientation, and display icon 829 may indicate the firing of a weapon. Each of the users holds a handheld interactive device that has a plurality of lights such as lights 134, 136, and 138 in FIG. 1 which provide identification and tracking information of the interactive device. The interactive devices having a trigger mechanism which is configured for communicating an occurrence of a trigger event.

Each of the interactive devices 510 and 512 may have been assigned a unique role to each of the interactive devices for users for one or more groups of users as illustrated in FIG. 4, where each role has an associated function or parameter for manipulating the virtual object in the virtual reality environment. The tracking system 112 monitors each interactive device 510 and 512 to determine a current status of each interactive device 510 and 512 such as the position, orientation, motion, existence of a triggering event, and the identification of the interactive device 510 and 512.

The system 801 interprets the current status of each interactive device based on the role assigned to the interactive device. For example, the user interacting with display 826—which is the speed of an object in this example—would interact with the virtual environment by waving the interactive device 512 to change the speed. Likewise, the user interacting with display 827—which is the angle of orientation of a virtual object—would interact with the virtual environment by waving the interactive device 512 to change the angle of orientation. Based on the input from the users, the system 801 varies the function or parameter associated with the role to manipulate the virtual object. Hence, a change to display icon 826 which indicates speed in this example, the virtual environment would change the speed of a virtual object, and would dynamically display the manipulated virtual object in the virtual reality environment.

Figure 9:
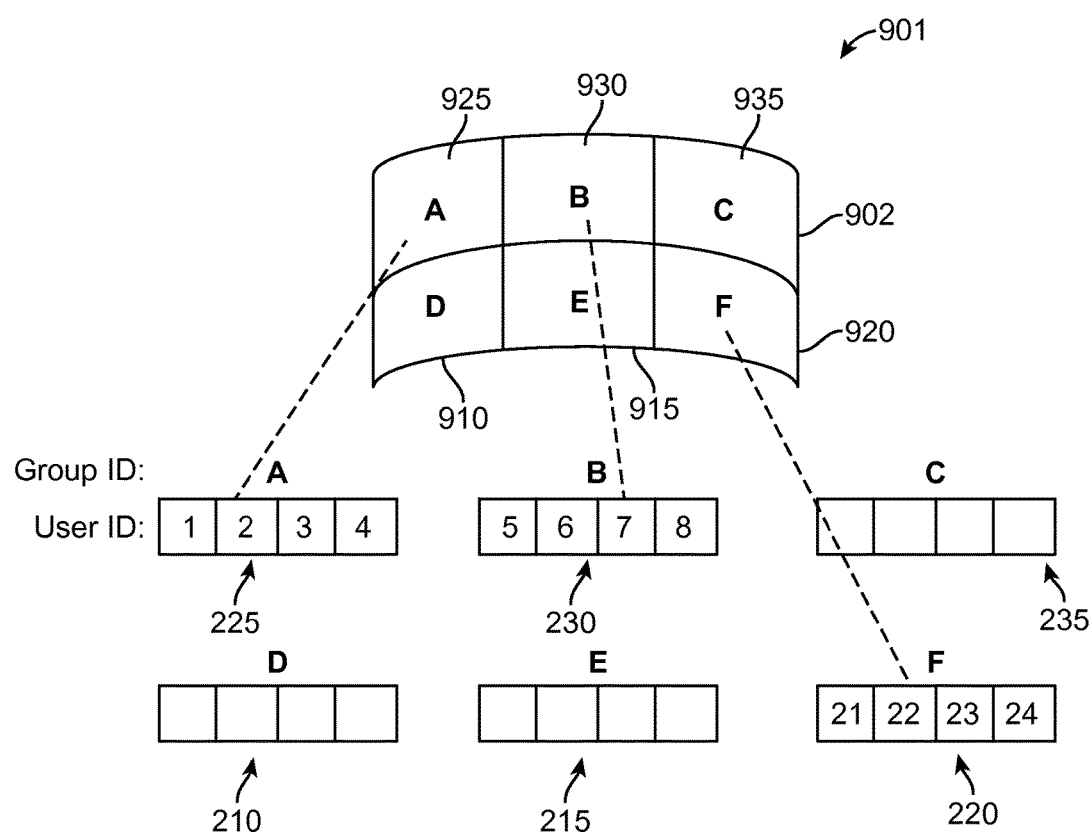
FIG. 9 illustrates exemplary multiple groups interacting in a virtual reality environment having virtual control consoles on a screen split into multiple screen sections.

FIG. 9 illustrates multiple groups interacting in a virtual reality environment having virtual control consoles on a screen split into multiple screen sections. The system 901 has benches 225, 230, 235, 210, 215, and 220, where each bench has four motion seats. In this embodiment, the screen 902 is split into 6 sections with each bench assigned to a specific section. In an embodiment, bench 225 is assigned to section 925, bench 230 is assigned to screen section 930, bench 235 is assigned to screen section 935, bench 210 is assigned to screen section 910, bench 215 is assigned to section 915, and bench 220 is assigned to section 920.

FIG. 9 illustrates a novel way for multiple users to interact with the screen split into multiple screen sections. The key aspect of this concept is to divide users into groups where each group has a dedicated sub-screen for viewing. The overall goal is not just limited to teamwork among all users, but teamwork may be an individual goal for each group.

An embodiment provides a multi-player game scenario as an example. To avoid cluttering on the shared screen, the number of aiming sights is limited, and the interactions can be categorized as explicit controls (for users with aiming sights) and implicit controls (for users without aiming sights).

Figure 10:
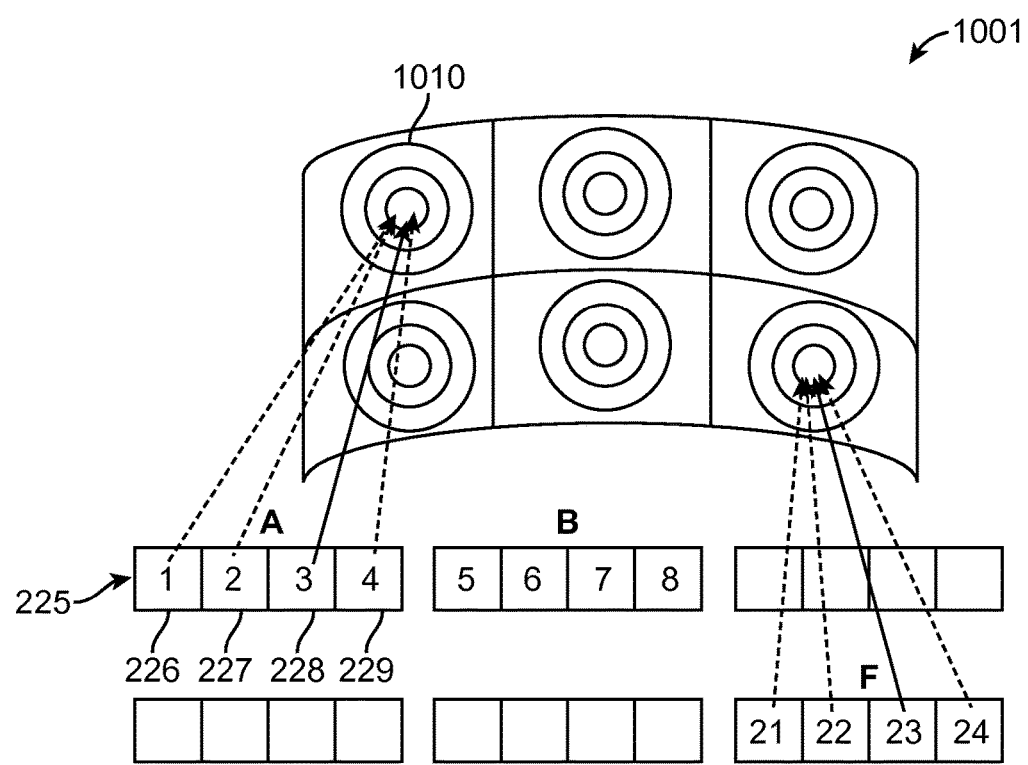
FIG. 10 illustrates exemplary multiple groups interacting in a virtual reality environment having multiple bulls-eye targets on a screen split into screen sections.

FIG. 10 illustrates multiple groups interacting in a virtual reality environment having multiple bulls-eye targets on a screen split in screen sections. Embodiments allow multiple users to collaborate through split screens where users are partitioned into groups of four corresponding to the screen sections. Users in each group shoot the target associated with the group, and the user with highest score becomes the group leader. Roles are assigned for the game play based on the scores, where the user with higher score is assigned to a more significant role. In an embodiment, the best player among each group may become the leader of the group and may have greater control or responsibilities than the users having a supporting role. In an embodiment, the leader may have a uniquely colored aim site. Users can collaborate within each group. In an embodiment, the roles of the members of the groups may be determined by the system in a manner such as that depicted in FIG. 4, where each group member could take control of one of the sub-tasks such as steering, speed control, weapon aiming, and weapon firing. In an embodiment, the users may not be limited to a single sub-task throughout a session. As an example, when one user finishes his sub-task, the user may then participate in other sub-tasks in one or more embodiments. The split screen is one way to handle collaboration among multiple users, but not absolutely necessary.

FIG. 11 illustrates multiple groups interacting in a virtual reality environment having multiple battle scenes on a screen split into screen sections. FIG. 12 illustrates details of a single group for the environment shown in FIG. 11. In an embodiment, bench 225 is assigned to screen section 1125, bench 230 is assigned to screen section 1130, and bench 220 is assigned to screen section 1120. The other benches are similarly assigned to their associated screen sections. The user in motion seat 228 is the leader of the group assigned to bench 225 and is firing at target "F" in the screen section 1125. The user in motion seat 233 is the leader of the group assigned to bench 230 and is firing at the target "C" in screen section 1130. The user in motion seat 223 is the leader of the group assigned to bench 220 and is firing at target "A" in screen section 1120.

The members in the supporting roles have display icons in the upper corner of the screen section. For example, FIG. 12 shows that the user in motion seat 231 has a display icon 650, the user in motion seat 232 has a display icon 730, and the user in motion seat 234 has a display icon 750.

In an embodiment, the non-leaders having supporting roles may also have explicit controls using the 5 DOF or 6 DOF tracking devices. The targets, aiming sights, bullets and shooting trajectories from each user are only shown on the sub-screen associated with the user group. Having the screen split into sections allows more users have explicit controls, without cluttering the entire screen. The users in the same group may also have a mix of explicit control and implicit control.

FIG. 13 illustrates multiple groups interacting in a virtual reality environment having multiple battle scenes on a split screen in one or more embodiments. FIG. 14 illustrates details of a single group for the environment shown in FIG. 13. In an embodiment, users in motion seats 226, 228, and 229 are firing at targets "E," "F," and "D" respectively; users in motion seats 232, 233, and 234 are firing at targets "F," "C," and "A" respectively; and users in motion seats 223, and 224 are firing at targets "A," and "C" respectively. FIG. 14 shows the details of group "B" in bench 230. The user in motion seat 231 has a supporting role and interacts with display icon 650. Having the screen split into sections allows the users from the same group to compete as a team against other groups in an embodiment.

Figure 15:
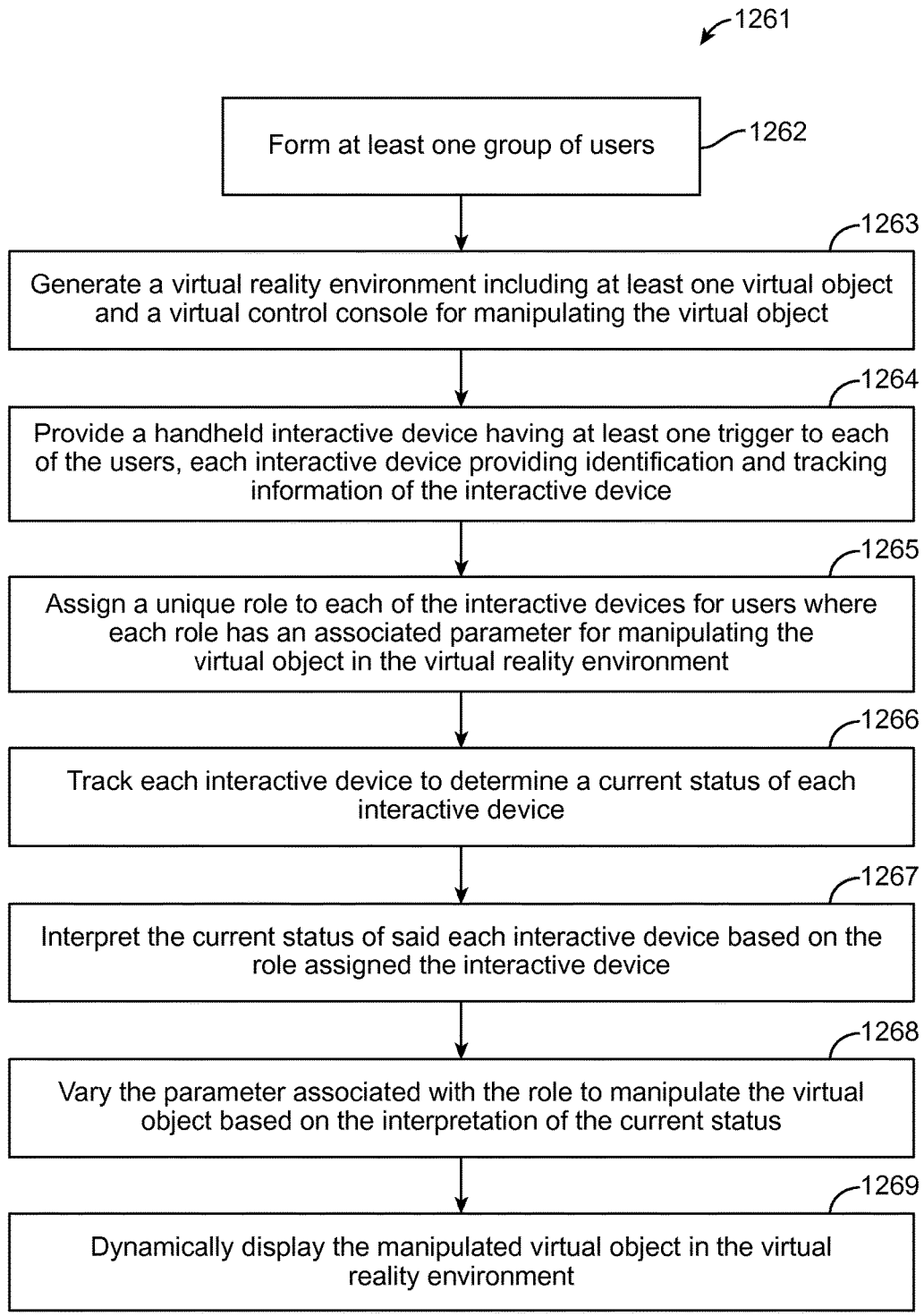
FIG. 15 is an exemplary process for providing an immersive virtual reality environment for one or more groups of users.

FIG. 15 illustrates an exemplary process 1261 for providing collaboration and/or competition for one or more groups of users. One or more groups of users are formed (step 1262). A virtual reality environment including at least one virtual object and a virtual control console for manipulating the virtual object is generated (step 1263). A handheld interactive device having at least one trigger is provided to each of the users, each interactive device providing identification and tracking information of the interactive device (step 1264). A unique role is assigned to each of the interactive devices for users where each role has an associated parameter or function for manipulating the virtual object in the virtual reality environment (step 1265). Each interactive device is tracked to determine a current status of each interactive device (step 1266). The current status of each interactive device is interpreted based on the role assigned the interactive device (step 1267). The parameter or function associated with the role to manipulate the virtual object is varied based on the interpretation of the current status (step 1268). The manipulated virtual object is dynamically displayed in the virtual reality environment (step 1269).

Referring to FIGS. 1 and 16-20, details of the tracking of interactive devices is discussed further below. Several approaches may exist for making tracking systems which may work in a similar fashion. Systems typically need two or more cameras monitoring device positions and orientations that are known or may be calculated (a process often referred to as "system calibration"). Systems typically need trackable targets (referred to as "markers") for the cameras to detect and track in 2D space as a CCD camera produces a 2D image. Employing a mathematical triangulation algorithm, the 3D position for each marker may be calculated (referred to as "reconstruction") based on readings from two or more cameras (referred to as "camera array"). Two is the minimal requirement for the number of cameras, although usually more cameras are used for redundancy (i.e., robustness) and also to expand the capture volume. Redundancy is important because not all markers can be seen by all cameras at all times. Whenever a marker is not seen by at least two cameras, such marker is impossible to be tracked (referred to as "occlusion"). Since the construction algorithm does not require each marker to be visible from all cameras at all time, having more cameras means a larger volume can be tracked.

The existing tracking systems may work in slightly different ways. Some systems use reflective ball-shaped markers, and each camera has infrared strobe around its lens. The infrared light emitted from the strobe is reflected off the markers back to the camera, and they appear as bright circular shapes against a very dark background, i.e. markers easily stand out from all other objects inside the tracking volume. Infrared light is usually used because it is invisible to human eyes, and it is relatively easy for cameras to pick up. However other colors of light can be used. The camera uses grey-scale CCDs, which allow them to capture at a very high frame rate. All cameras are synchronized together to make sure all captured frames are in phase.

To track a non-deformable object (referred to as a "rigid object"), several markers are placed around the object in a non-symmetrical manner. The minimal marker count is three to provide 6-DOF tracking (i.e. 3-DOF position and 3-DOF orientation). These markers (referred to as a "marker set") form an unique pattern in a way that, regardless of how this object is orientated, an algorithm is able to figure out the position and orientation of the rigid object using only the position of each marker within a marker set. Even though 3 markers are enough to form a unique pattern, in general, 4 or more markers are used, due to multiple objects may be tracked at the same time. Moreover, when the size of the tracked object is limited, there may be a limited set of marker patterns using only 3 markers. Furthermore, markers may be occluded frequently, and the orientation of the object may be completely lost when a 3-marker pattern is left with only 2 markers, thus having additional markers may provide additional robustness in this situation. However, having several markers in a cluster with close proximity between the markers can greatly decrease the tracking quality, due to cameras may not see each marker clearly in a cluttered marker set.

Multiple rigid objects can be tracked at the same time, provided each rigid object is attached with a unique pattern of markers. Note that each marker in a marker set is not differentiable from the rest of the markers, the system relies on the unique patterns to distinguish one rigid object from another. A big drawback to this approach is that if two markers traverse across each other, the system may be confused. This process is usually referred to as "marker swapping". This may happen easily when two rigid objects either pass by each other or bounce off each other, when too much proximity occurs between markers.

Other systems employ pulsed light emitting from each marker (referred to as an "active marker"). Some systems rely on light that is encoded in a binary form. For example, an 8-bit binary encoding could encode 256 markers. In principle, with as few as 8 consecutive frames captured by the camera array, the system should be able to identify the unique blinking pattern for each active marker, and differentiate up to 256 markers (and get the unique marker ID from each marker's pulsing pattern). Other systems require that, during each frame, only one marker emits light and is seen by the camera, while all other markers do not emit light. All markers alternate, one emits during each frame. The downside is that, when quantity of markers increases, the system needs more frames to cycle through all markers. Most of the time each marker remains off, meaning the marker is not being tracked by the system, thus reducing the tracking smoothness. For 6 DOF rigid object tracking, the non-collinear marker set is still required where the minimal marker count is 3. However, with the ability to identify each marker, the system could potentially track multiple rigid objects that share the same marker pattern, and still able to differentiate one rigid object from another. This may be the basis of how interactive devices may be tracked for large audiences.

Figure 16:
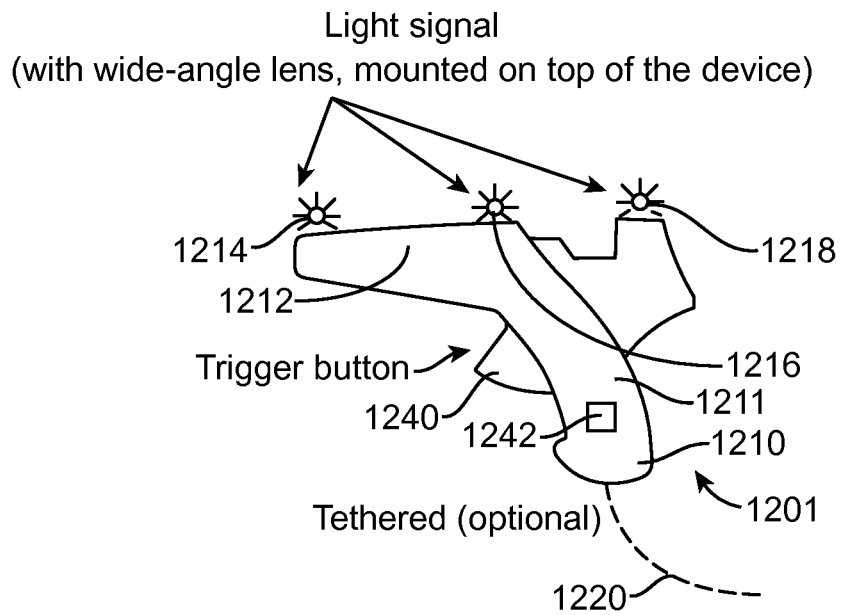
FIG. 16 depicts a handheld interactive device having lights mounted on the top of the device.

FIG. 16 depicts a handheld interactive device 1201 having lights 1214, 1216, and 1218 mounted on the top of the device. The interactive device 1201 has a controller 1242, a body 1210, a handle section 1211, a barrel section 1212, a trigger 1240, and may be physically secured to a location by an optional tether 1220. As used herein, the barrel section generally refers to the portion of the interactive device which is generally parallel with the expected trajectory of a virtual device. The handle section generally refers to the section of the device which is held by the user during typical operation. The interactive device 1201 captures 5 DOF (could also be 6 DOF) user movement, with additional trigger button(s) controlled by the user, allowing better interactions in 3D space. The interactive device 1201 is an apparatus for interaction of a plurality of users in an application, providing both tracking and trigger action. Embodiments employing a plurality of pointing devices that are capable of emitting multiple signals such as infrared or near-infrared lights (active markers).

Figure 17A:
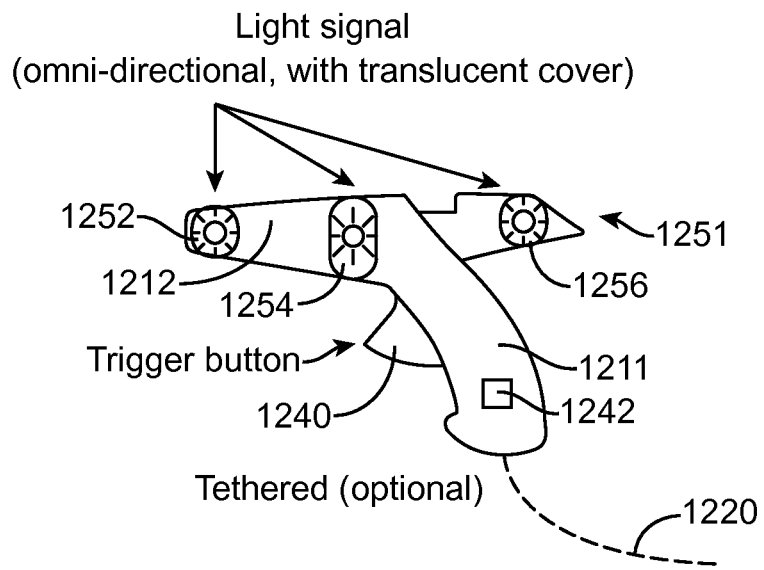
FIG. 17A depicts a handheld interactive device having a translucent cover over the lights to provide a wide radiative emission pattern.

FIG. 17A depicts a handheld interactive device 1251 having a translucent cover over the lights to provide a wide radiative emission pattern. Interactive device 1251 employs three lights 1252, 1254, 1256 having a translucent cover such that the far-field light emission pattern may be much greater than that of the interactive device 1201 shown in FIG. 15 which uses surface-mount LEDs as the light source, which is only visible from the top. The lights having a translucent cover may allow the lights or LEDs to be seen from a wider range, thus reducing occlusion. By having a ring-like translucent cover on the device surface, the light markers 1252, 1254, and 1256 may have a far-field emission pattern of nearly 360 degrees around the device. This is in contrast with the interactive device 1201 in FIG. 16 where the light markers 1214, 1216, and 1218 are only visible from the top, as the body 1210 blocks the emitted light to a certain extent. In one or more embodiments, interactive devices 1251 having four or more lights are contemplated.

In an embodiment, the system controller 110 is preferably further configured for disabling a specific interactive device 1251 entirely, or for disabling only the lights on a specific interactive device 1251.

Each interactive device 1251 provides a means to be detected by a high-speed infrared camera array, and the identity of each light signal may be distinguished. Thus each interactive device may be distinguished. As discussed above, each light signal emitted from the interactive device 1251 is reconstructed as one 3D point with x, y, z coordinates. Embodiments of the encoded marker tracking system provide good robustness even when the interaction devices are passing by each other with close proximity. Each light signal can be distinguished by its unique ID, without "marker swapping" which is commonly seen with non-encoded marker tracking systems. Each tracking system also provides for a means for detecting trigger actions by the user, and recoding the identity of the trigger actions.

Figure 17B:
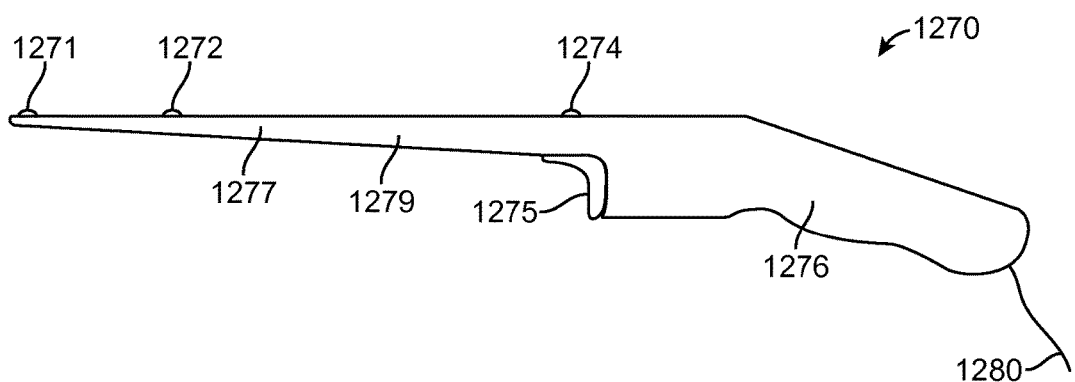
FIG. 17B is a side view of another embodiment of an interactive device having a translucent cover to provide a wide radiative emission pattern.
Figure 17C:
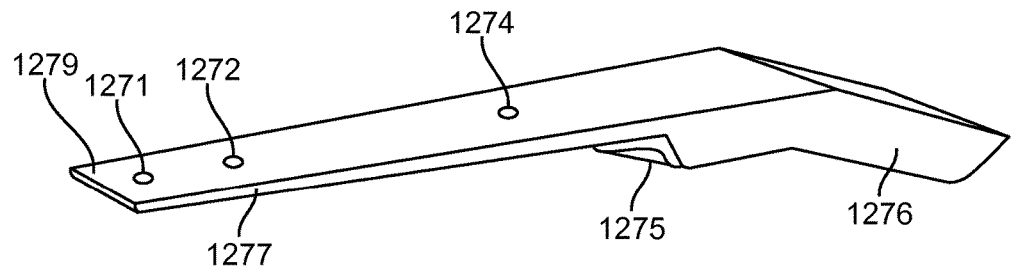
FIG. 17C is a top, perspective view of the interactive device in an embodiment.
Figure 17D:
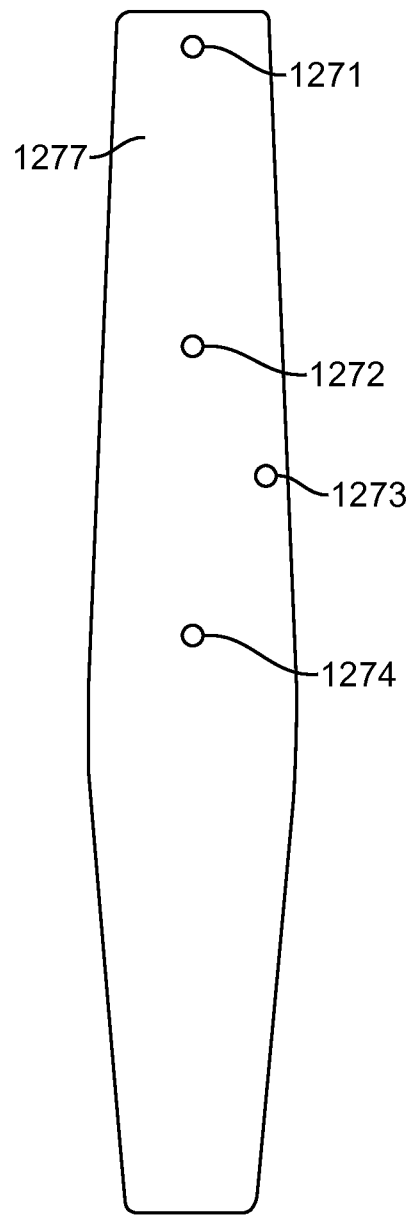
FIG. 17D is a top view of the interactive device in an embodiment.

FIGS. 17B, 17C, and 17D depict a handheld interactive device 1270 having a translucent cover 1277 over the lights 1271, 1272, 1273, and 1274 to provide a wide radiative emission pattern. Interactive device 1270 employs multiple lights 1271, 1272, 1273, and 1274 with a whole translucent cover 1277 for the front part of the device. The far-field light emission pattern may be much greater than that of the interactive device 1201 shown in FIG. 15. The lights having a translucent cover 1277 may allow lights be seen from a wider range, reducing occlusion. In one or more embodiments, the occlusion is reduced when the top of the interactive devices face away from the cameras. The lights are mounted onto a thin tree-like structure holding up the lights inside the device. The design of the thin structure is to bring the occlusion problem to a minimum.

The interactive device 1270 has an elongated barrel section 1279, a handle section 1276, a trigger button 1275, and an optional tether 1280. In one or more embodiments, the tether 1280 may be tethered to the seat with electrical cables providing power and transmitting signals and prevent users from removing the interactive devices. In an embodiment, the tether 1280 may simply prevent users from removing the interactive devices 1270 from the theater and the interactive devices may be battery-powered and completely wireless, using radio frequency for signal transmission. Lights 1271, 1272, and 1274 are collinear and parallel with the expected trajectory of a virtual projectile. Light 1273 is offset from the line joining lights 1271, 1272, and 1274. Additional lights or other patterns for the arrangement of lights for providing enhanced redundancy are contemplated in one or more embodiments. In one or more embodiments, the interactive device 1270 may comprise two or more lights. The lights 1271, 1272, 1273, and 1274 are covered by a translucent cover 1277 which allows an omni-directional radiative emission pattern to be projected from each of the lights. Such a configuration may reduce problems associated with occlusion for shared, virtual reality environments having a larger number of concurrent users. In one or more embodiments, the lights 1271, 1272, 1273, and 1274 may be light emitting diodes with emission wavelengths in the visible or infrared spectrum.

Figure 18:
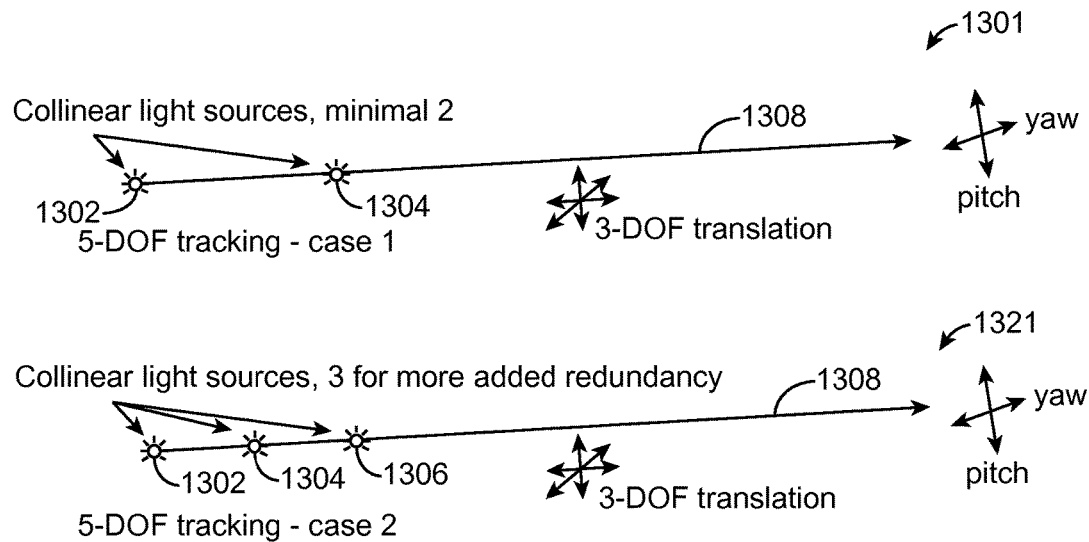
FIG. 18 illustrates two scenarios for providing five degree of freedom tracking.

FIG. 18 illustrates two configurations 1301 and 1321 for providing five degree of freedom tracking. Configuration 1301 has two lights 1302 and 1304 collinearly located on an interactive device such as interactive device 1251. Using a minimum of 2 reconstructed collinear 3D points on each interactive device, the aiming direction of the interactive device can be determined, consisting of 5 degrees-of-freedom ("DOF") information including the heading, pitch, and the 3D position in x, y, z coordinates. This information not only provides the aiming information on a 2D screen, but 5-DOF interactions including translations. Configuration 1301 has a first light 1302 and a second light 1304 positioned collinearly and parallel with the expected trajectory of the virtual projectile 1308.

Configuration 1321 has three lights 1302, 1304, and 1306 which are all collinear with each other to provide 5 DOF tracking. In the event that one light signal becomes completely occluded, the system can still acquire the aiming direction from the remaining two light signals. Configuration 1321 has a first light 1302, a second light 1304, and a third light 1306 positioned collinearly and parallel with the expected trajectory of a virtual projectile 1308.

Figure 19:
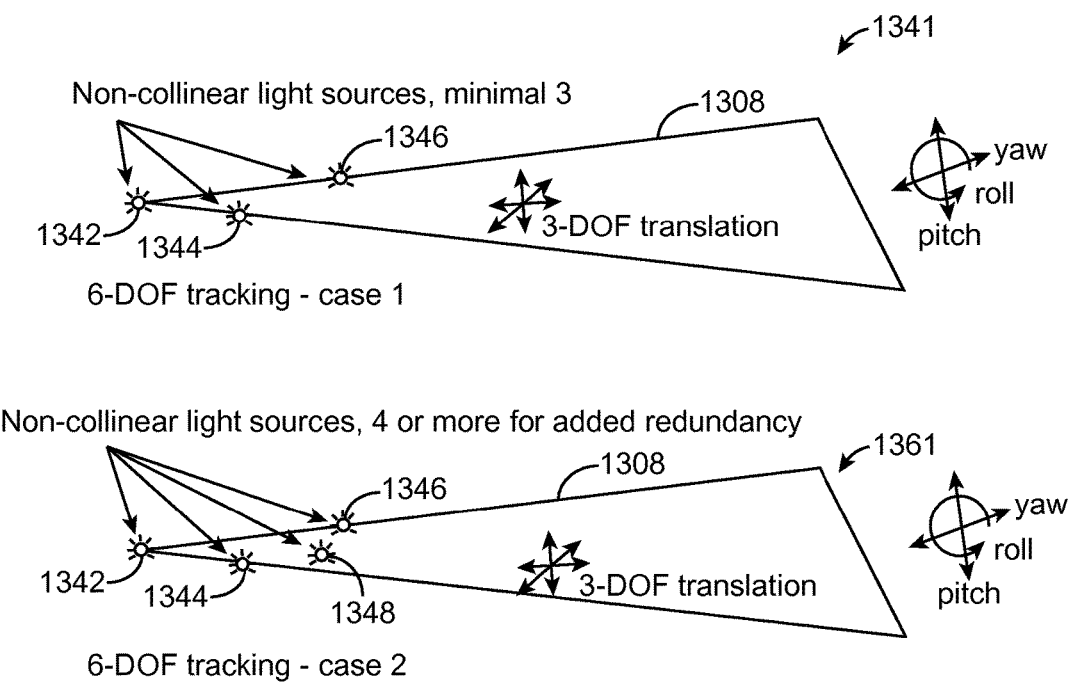
FIG. 19 illustrates two scenarios for providing six degree of freedom tracking.

FIG. 19 illustrates two scenarios for providing six degree of freedom tracking. Configuration 1341 uses three lights 1342, 1344, and 1346 in which lights 1342 and 1346 are collinear, but light 1344 is offset with respect to the line joining lights 1342 and 1346. Configuration 1341 uses a minimum of 3 reconstructed non-collinear 3D points on each interactive device to provide the aiming direction of the interactive consisting of 6 degrees-of-freedom (DOF) information including heading, pitch, roll, and 3D position in x, y, z coordinates. This gives the user not only the aiming information on a 2D screen, but full 6-DOF interactions including translations. Configuration 1341 has a first light 1342 and a second light 1346 positioned collinearly and parallel with an expected trajectory of the virtual projectile 1308, and a third light 1344 positioned offset from expected trajectory of the virtual projectile 1308.

Configuration 1361 has a total of four lights where a first light 1342 and a second light 1346 are positioned collinearly and parallel with an expected trajectory of a virtual projectile 1308, and a third light 1344 and a fourth light 1348 both positioned offset from expected trajectory of the virtual projectile 1308. For 6 DOF tracking, 4 light signals are mounted on each interactive device in a non-symmetrical fashion. In the event that one light signal becomes completely occluded, the system can still acquire full 6 DOF translation information from the remaining 3 light signals. Such redundancy provides extra robustness.

In one or more embodiments, a plurality of lights are preferably a subset of lights positioned collinearly and parallel with an expected trajectory of a virtual projectile, and the remaining lights positioned offset from the expected trajectory of the virtual projectile, and the quantity of lights exceeds three.

Figure 20:
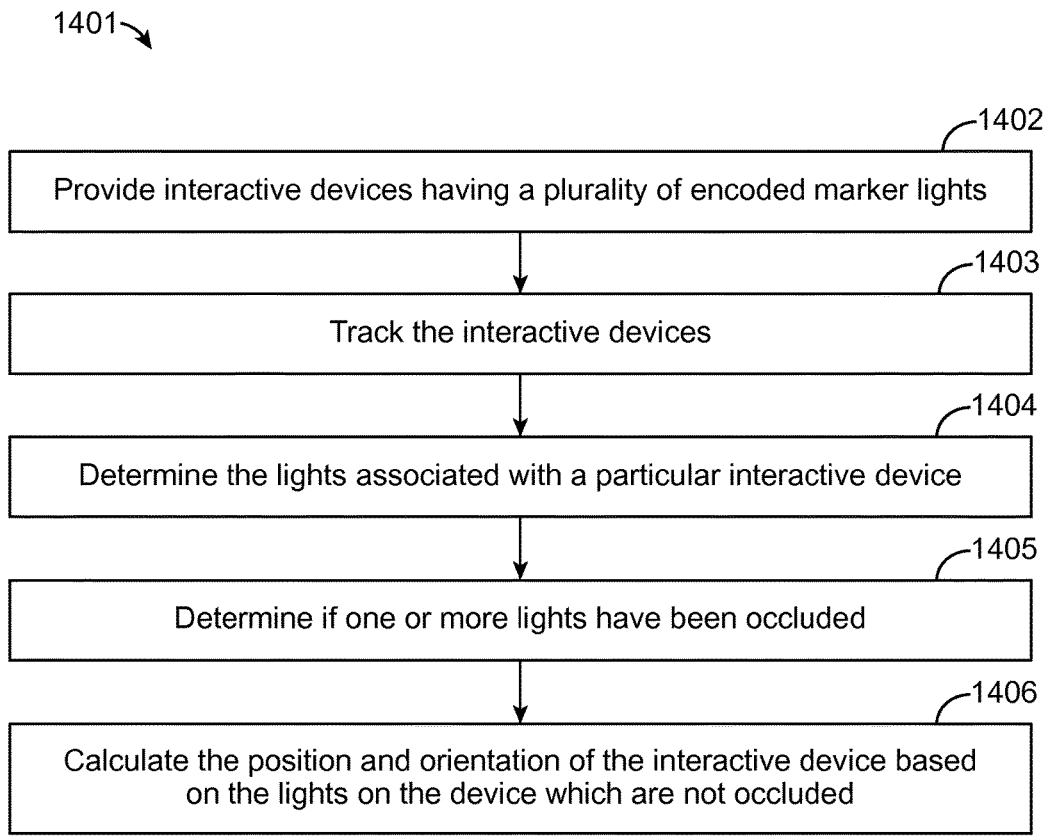
FIG. 20 is an exemplary process for determining position and orientation of each interactive device for a large group of users.

FIG. 20 presents an exemplary process 1401 for determining position and orientation of interactive devices for a large number of users. Interactive devices having a plurality of encoded marker lights is provided to users (step 1402). The interactive devices are tracked (step 1403). The lights associated with a particular interactive device are determined (step 1405). Determine if one or more lights have been occluded (step 1406). If one or more of the lights are occluded, calculate the position and orientation based on the lights on the device which are not occluded (step 1406).

A novel design for theater-sized interactive full dome system is disclosed herein. For edutainment, it combines Hollywood style story telling with cutting edge technologies, providing a group of audience the feast of immersive 4D theater experience. For industrial training, the fully immersive and interactive dome delivers real-time virtual reality ("VR") tutorials for enhanced training experience. Compared with traditional VR training facilities like a computer assisted virtual environment ("CAVE"), it hosts larger group of trainees for lower training cost per capita, and provides the means to conduct collaborative training with multiple trainees.

The design mainly targets two type of usages: 1) education and entertainment combined (edutainment), and 2) industrial training. For edutainment, embodiments combine Hollywood style of storytelling with cutting edge technologies, including interactive handheld devices and motion seats, and deliver a group of audience the feast of immersive 4D theater experience. For industrial training using real-time VR tutorials, the dome provides fully immersive rendering and interactivity that can greatly enhances the training experience. Compared with traditional VR training facilities like the CAVE, the dome is capable of hosting larger group of trainees, lowering the training cost per capita, and conducting collaborative training with multiple trainees.

CAVE-like platforms have been developed for immersive Virtual Reality ("VR") experience. They track user's head and control wand usually with 6 degrees of freedom (DOF) to navigate inside the virtual environment and interact with the contents. Due to its immersive experience and intuitive manipulation capability, it quickly gained popularity in both research and industry community. It has been used as a great educational tool from teaching earth science to abstract mathematics. On the other hand, head mounted display ("HMD") systems have also gained popularity due to the ability to deliver good immersive experience at a much lower cost. In recent years the concept of edutainment became popular. It brings game-like contents into VR based educational scenarios to make learning more effective and fun. Results indicate that students were more engaged with this new concept, while having a long lasting memory of the learning experience. As the public interest rapidly grows on various new VR technologies, more and more museums and theme parks are selecting realtime VR as their presentation media. This trend also influences the future of the entertainment industry, especially for amusement facilities. This presents a challenge for traditional VR to host multiple viewers at the same time.

Over the years new types of dome platforms have emerged for immersive content displays. These designs brought various challenges to attention. For example, one concept discussed many dome design related aspects like dome-shape wrapping, stereoscopic viewing, real-time content integration, however they only stayed on the design level and did not provide a overall working solution. On the other hand, another concept used a cluster of 18 PCs for stereoscopic rendering in the dome, a system that is too complicated to set up and maintain. In comparison, one or more embodiments provide a working solution of the interactive dome design for edutainment and immersive training. Accompanied by 3D sound and 4D motion seats systems, embodiments provide a truly unique and overwhelming adventurous experience. Beyond edutainment purposes, embodiments provide a great means for industrial training. It's been proven very helpful to conduct trainings in dangerous or logistically impossible areas, for example preparing mine workers the escape routes during emergencies, or firefighting scenarios, etc. The dome training facility also provides the benefits of hosting a large group of trainees for collaborative training scenarios.

Embodiments comprise three main parts: dome and its projection system, real-time interaction, and 4D theater system. The novelty of one or more embodiments can be seen as combining Hollywood feature film quality, stunning Virtual Reality characters, 4D multi-sensory theater platform and full interactivity for every participant. Specifically, embodiments have the following merits: compared with traditional museums and educational cinema showings, embodiments add entertainment elements into the film, making learning more fun and easy to understand. More importantly it provides an immersive group training environment shared by multiple trainees at the same time. Unlike conventional 4D theaters with flat screens and no interactions, embodiments offer unprecedented experiences with full immersion and real-time interactions for each participant.

The dome measures at 9 meters in diameter, tilted at an angle of 45 degree above the floor plane in an embodiment. Audience seats are arranged in three rows on a raised platform, with all seats facing the center of the dome screen, about 3 to 5 meters away depending on the seating position. The average field of view ("FOV") for the audience is 135 degrees. Embodiments strike a good balance between viewing quality and construction cost, and deliver the fully immersive feeling for the audience. To achieve a wider FOV however, not only the cost per capita would increase significantly, it would also compromise the stereoscopic effects.

The structure of the dome comes in pieces and assembled on-site. The screen is made of a soft vinyl type material; it encloses the whole dome structure and maintains its shape using a vacuum fan that sits on top of the dome. 3 projectors are mounted on the rim of the dome structure, shooting towards the dome center. Software is used for wrapping and edge blending to achieve seamless rendering on the spherical screen. The projector does not need fish-eye lens or special cooling, which brings down the overall cost and simplifies installation. Embodiments slightly sacrifice the image brightness and pixel count when compared with systems using more projectors; however the 3 projectors are all driven by one single Nvidia Quadro K6000 card running on a HP Z820 workstation. This eliminates the need to synchronize multiple projectors and workstations, which provides a good basis for outputting active stereoscopic 3D rendering in the dome.

Embodiments of the interactive system track a small group of users via handheld devices. Each device was built with a set of optical-camera tracking markers and a wireless gaming controller. Embodiments may use 6 Vicon cameras to track position and orientation of each device. Cameras are mounted on the two pillars holding the dome structure in place. The Sony Navigation controllers were used as the wireless control devices. For simplicity, only the bottom trigger button (L2 trigger) is used and all remaining buttons are blocked. This trigger button has been programmed inside simulation software to shoot targets, manipulate VR objects, and control the flow of the simulation. As an example, participants can decide how the simulation story develops as they choose which way to go at a fork of the road.

Embodiments incorporate multi-sensory motion seats that greatly enhance the overall interaction experiences. Each seat bench is bolted to a motion platform with 3 degrees of freedom ("DOF") movement to accommodate 4 riders. The platform is driven by 3 air piston actuators that essentially generate the pitch, roll and heave (height adjustment) motions. The motion seats system also delivers multi-sensory effects through pokers (seat and back), leg ticklers, smell/water sprays, air sprays (face and back of neck) and seat vibrations. The system is controlled by MIDI over Ethernet. Each actuator uses different midi channel or midi notes.

The content for embodiments was developed in a VR platform. It provides great flexibilities in both content importing and interaction programming. Here we describe three scenarios.

Embodiments combine an 8 minute high quality Hollywoodstyle story-telling experience with VR technologies. It presents a tapestry of short teaser scenes showcasing many possibilities the platform could offer, from soaring scenery to ocean creatures and from high speed car racing to space battle and exploration. Among the highlights, the audience aim and shoot asteroids and dragons in a space battle, dive in the ocean and feed the dolphins as they approach, and go on full-speed road race while immersed in the pine forest smell.

Embodiments include an action-packed shooting game called "mine coaster". Players go on an underground roll coaster ride at a spooky mining site, aim and shoot crystals along the ride to earn points, and destroy road blockers to prevent crashing into them. The whole ride is like a maze, players must pick which way to proceed when coming to several forks along the track, or they would get stuck in a dead end. People really enjoyed this type of game experience which is very rarely seen elsewhere.

Embodiments include many industrial training applications running on various platforms. These training applications can be easily ported into embodiments, creating a whole new experience. Due to the large FOV, the same content feel more immersive when viewing inside the dome. In addition to this, the dome is perfect for group training with multiple trainees in the same session, lowering the cost per capita compared to other systems. Embodiments include design training applications that require collaborative team work, making it more fun and effective.

Embodiments mainly address three aspects: 1) the marriage of Hollywood film/animation with VR contents, 2) game-like multiuser interactive system, and 3) amusement park-style 4D theater system. The system has the following merits: compared with traditional educational media such as cinemas and museums, the added interactive elements make the learning part more enjoyable and effective. Compared with other interactive facilities like CAVE, embodiments host multiple attendees per session, lower the training cost per capita and offer collaborative training environment. Embodiments provide a way to interact with and control the content in real-time, creating a brand new entertainment experience.

The system is being improved in several aspects, including stereoscopic effects, content creation pipeline, streamlining the aim and shoot device, to make it a multi-functional platform for entertainment, education and training.

Although the invention has been discussed with reference to specific embodiments, it is apparent and should be understood that the concept can be otherwise embodied to achieve the advantages discussed. The preferred embodiments above have been described primarily as immersive virtual reality systems and methods for a larger number of concurrent users. In this regard, the foregoing descriptions of the virtual reality environments are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for providing an immersive virtual reality environment for a plurality of users, the method comprising:
   generating a virtual reality environment including a display screen having at least one virtual object and a virtual control console displayed on the display screen, the virtual control console having a plurality of display icons, each display icon in the virtual console representing a different function associated with the virtual object;
   providing a handheld interactive devices to each of the users, each handheld interactive device having a plurality of lights emitting a unique light pattern providing identification and tracking information of said each handheld interactive device, said each handheld interactive device having a trigger mechanism configured for communicating an occurrence of a trigger event;
   assigning a unique role to said each handheld interactive devices for users forming a single group of users, each role having an associated function for manipulating the virtual object in the virtual reality environment, each role for said each handheld interactive device being identified by a tracking system based on the unique light pattern emitted for said each handheld interactive device;
   tracking the plurality of lights of said each interactive device by the tracking system to determine a current status of said each handheld interactive device, the current status comprising a position, orientation, motion, existence of the triggering event, and the identification of said each handheld interactive device;
   interpreting the current status of said each handheld interactive device based on the role assigned to said each handheld interactive device;
   varying the function associated with the role to manipulate the virtual object based on the interpretation of the current status; and,
   dynamically displaying the manipulated virtual object in the virtual reality environment.

2. The method for providing an immersive virtual reality environment for a plurality of users of claim 1, wherein assigning a unique role to each of the handheld interactive devices further comprises:
   enabling all handheld interactive devices to have a role of firing virtual projectiles;
   displaying one or more targets in the virtual reality environment;
   monitoring the performance of the handheld interactive devices; and,
   assigning roles based on the relative performance of the handheld interactive devices.

3. The method for providing an immersive virtual reality environment for a plurality of users of claim 1, further comprising providing feedback to the users.

4. The method for providing an immersive virtual reality environment for a plurality of users of claim 3, wherein providing feedback to the users comprises one or more of the following: providing sound effects, enabling motion seats, providing visual effects, or providing visual representation of aiming sights.

5. The method for providing an immersive virtual reality environment for a plurality of users of claim 1, wherein one of the roles includes a leader role, the leader role having a function of firing a virtual projectile within the virtual reality environment.

6. The method for providing an immersive virtual reality environment for a plurality of users of claim 5, wherein interpreting the status of the handheld interactive device having the leader role further comprises:
   detecting the existence of the trigger event from the handheld interactive device having the leader role;
   determining a trajectory of the virtual projectile based on the position and orientation of the handheld interactive device having the leader role; and,
   determining if the trajectory of the virtual projectile affected one or more virtual objects.

7. The method for providing an immersive virtual reality environment for a plurality of users of claim 1, wherein the roles include a leader role for firing virtual projectiles, a steering role for maneuvering a virtual object, a speed control role for controlling the speed of the virtual object, and a weapon aiming role for aiming the handheld interactive device to a virtual object.

8. A method for providing an immersive virtual reality environment for a plurality of users, the method comprising:
   forming a first group of users and a second group of users from a plurality of users;
   providing a handheld interactive device to each of the users, each handheld interactive device having a plurality of lights emitting a unique light pattern providing identification and tracking information of said each handheld interactive device, said each handheld interactive device having a trigger mechanism configured for communicating an occurrence of a trigger event;
   generating a virtual reality environment including a display screen having at least one virtual object and a first and second virtual control console displayed on the display screen, wherein the first virtual control console is interacted with by the first group of users and the second virtual control console is interacted with by the second group of users, each virtual control console having a plurality of display icons each representing different functions associated with the virtual object accessible through respective first and second virtual control consoles;
assigning a unique role to said each handheld interactive device for users within the first and the second groups of users, each role comprising an associated function for manipulating virtual objects in a virtual environment;
tracking the plurality of lights of said each handheld interactive device to determine a current status of said each handheld interactive device, the current status comprising a position, orientation, motion, existence of the triggering event, and the identification of said each handheld interactive device;
interpreting the current status of said each handheld interactive device based on the role assigned to said each handheld interactive device and the associated group;
manipulating the functions associated with the virtual object to provide an altered virtual object; and,
dynamically displaying the altered virtual object.

9. The method for providing an immersive virtual reality environment for a plurality of users of claim 8, wherein generating a virtual reality environment further comprises providing a single screen having virtual objects representing the first and second groups.

10. The method for providing an immersive virtual reality environment for a plurality of users of claim 8, wherein generating a virtual reality environment further comprises providing a separate screen section for the first and second groups.

11. The method for providing an immersive virtual reality environment for a plurality of users of claim 8 further comprising forming additional groups of users.

12. The method for providing an immersive virtual reality environment for a plurality of users of claim 8, further comprising providing feedback to the users.

13. The method for providing an immersive virtual reality environment for a plurality of users of claim 8, wherein providing feedback to the users comprises one or more of the following: providing sound effects, enabling motion seats, providing visual effects, or providing visual representation of aiming sights.

14. The method for providing an immersive virtual reality environment for a plurality of users of claim 8, wherein assigning a unique role to each of the handheld interactive devices further comprises:
for the first and second groups:
enabling all handheld interactive devices to have a role of firing virtual projectiles;
displaying one or more targets in the virtual reality environment;
monitoring the performance of the handheld interactive devices; and,
assigning roles based on the relative performance of the handheld interactive devices.

15. The method for providing an immersive virtual reality environment for a plurality of users of claim 8, wherein one of the roles includes a leader role, the leader role having a function of firing a virtual projectile within the virtual reality environment.

16. The method for providing an immersive virtual reality environment for a plurality of users of claim 15, wherein interpreting the status of the handheld interactive device having the leader role further comprises:
detecting the existence of the trigger event from the handheld interactive device having the leader role;
determining a trajectory of the virtual projectile based on the position and orientation of the handheld interactive device having the leader role; and,
determining if the trajectory of the virtual projectile affected one or more virtual objects.

17. The method for providing an immersive virtual reality environment for a plurality of users of claim 8, wherein the roles include a leader role for firing virtual projectiles, a steering role for maneuvering a virtual object, a speed control role for controlling the speed of the virtual object, and a weapon aiming role for aiming the handheld interactive device to a virtual object.

18. A system for providing an immersive virtual reality environment for a plurality of groups of users, the system comprising:
a virtual reality environment including a display screen for groups of users and a virtual control console displayed on the display screen, the virtual control console displaying a user controlled output associated with a virtual object displayed in the virtual environment and manipulated by user control;
a plurality of handheld interactive devices for interacting with the virtual object, each handheld interactive device comprising:
a housing having a barrel section and a handle section;
a plurality of lights positioned within the barrel section, the lights spaced apart and emitting a unique light emission pattern, the plurality of lights generally aligned with an expected trajectory of a virtual projectile, the unique light emission pattern being different between any two handheld interactive devices;
a trigger mechanism positioned on the handle section; and,
a handheld interactive device controller coupled to the trigger mechanism and configured to:
provide electrical current to the lights,
control the lights to emit the unique light emission pattern, and
communicate trigger events to a system controller;
a plurality of sensors monitoring the handheld interactive devices for light signals and trigger events, the plurality of sensors outputting real-time device current status for each of the handheld interactive devices; and,
a system controller receiving the real-time current status for each of the handheld interactive devices and updating the virtual reality environment.

19. The system for providing immersive virtual reality environment for a plurality of groups of users of claim 18, wherein the virtual reality environment further comprises a spherical screen.

20. The system for providing immersive virtual reality environment for a plurality of groups of users of claim 18, wherein the virtual reality environment further comprises a dome.

21. The system for providing immersive virtual reality environment for a plurality of groups of users of claim 18, wherein the virtual reality environment further comprises:
a spherical screen for displaying three dimensional images;
multiple motion seats for a plurality of users; and
a surround sound system for providing sound effects to the users.

* * * * *